United States Patent [19]

Weyer

[11] Patent Number: 4,838,103
[45] Date of Patent: * Jun. 13, 1989

[54] FLUID-POWER DEVICE WITH ROLLERS

[76] Inventor: Paul P. Weyer, 48811 284th SE., Enumclaw, Wash. 98022

[*] Notice: The portion of the term of this patent subsequent to May 3, 2005 has been disclaimed.

[21] Appl. No.: 6,007

[22] Filed: Jan. 20, 1987

Related U.S. Application Data

[63] Continuation-in-part of Ser. No. 931,223, Nov. 14, 1986, Ser. No. 881,904, Jul. 3, 1986, Ser. No. 662,256, Oct. 17, 1984, Ser. No. 692,293, Jan. 17, 1985, and Ser. No. 803,954, Dec. 2, 1985, each is a continuation-in-part of Ser. No. 575,228, Jan. 30, 1984, Pat. No. 4,590,816.

[51] Int. Cl.[4] .................. F01B 3/00; F16H 25/24; F16H 55/18
[52] U.S. Cl. .................. 74/89.15; 74/424.8 B; 74/424.8 C; 74/441; 92/2; 92/33
[58] Field of Search ......... 74/89.15, 424.8 B, 424.8 C, 74/424.8 R, 441, 458, 459; 92/2, 31, 33, ; 277/136, 137, DIG. 7, DIG. 9; 384/504; 403/355, 356, 359

[56] References Cited

U.S. PATENT DOCUMENTS

| | | | |
|---|---|---|---|
| 717,987 | 1/1903 | Gurney | 384/504 |
| 2,067,357 | 1/1937 | Terry | 74/424.8 |
| 2,131,151 | 9/1938 | Smith | 74/424.8 C |
| 2,482,082 | 9/1949 | Wahlberg | 74/424.8 C |
| 2,488,256 | 11/1949 | Anderson | 74/424.8 C |
| 2,525,326 | 10/1950 | Wahlmark | 74/424.8 C |
| 2,751,789 | 6/1956 | Orenick | 74/424,8 C |
| 2,791,128 | 5/1957 | Geyer et al. | 74/441 |
| 2,945,387 | 7/1960 | Geyer | 74/89 |
| 2,959,064 | 11/1960 | Geyer et al. | 74/441 |
| 3,020,775 | 2/1962 | Musser | 74/440 |
| 3,128,634 | 4/1964 | Eastman | 74/424.8 |
| 3,165,007 | 1/1965 | Neubarth | 74/424.8 B |
| 3,187,592 | 6/1965 | Geyer | 74/89 |
| 3,255,806 | 6/1966 | Meyer et al. | 160/188 |
| 3,295,385 | 1/1967 | Jenny | 74/424,8 B |

(List continued on next page.)

FOREIGN PATENT DOCUMENTS

| | | |
|---|---|---|
| 2260300 | 6/1974 | Fed. Rep. of Germany . |
| P2807952.9 | 2/1978 | Fed. Rep. of Germany . |
| 2803459 | 8/1979 | Fed. Rep. of Germany . |
| 3144306 | 7/1981 | Fed. Rep. of Germany . |
| 1496924 | 10/1966 | France . |
| 93721 | 12/1967 | France . |
| 2338425 | 1/1977 | France . |
| 399084 | 10/1942 | Italy .................. 74/424.8 C |
| 8101440 | 5/1981 | PCT Int'l Appl. ........... 92/33 |
| 386809 | 4/1965 | Switzerland . |
| 406747 | 1/1966 | Switzerland . |
| 890440 | 2/1962 | United Kingdom . |
| 1362401 | 8/1974 | United Kingdom . |

OTHER PUBLICATIONS

Spiracon Brochure—Planetary Roller Screws, A Unique Innovation in Mechanical Linear Actuators, a 4 page Brochure, (undated).
Moscow Bauman Tech. Coll. Week 84/ 20 Issued Jun. 27, 1984, a one page Description.
Mechanisms, Linkages, and Mechanical Controls, by Chironis, a 4 page Brochure.

Primary Examiner—Leslie A. Braun
Assistant Examiner—Scott Anchell

[57] ABSTRACT

A fluid-powered actuator having a body with interior helical grooves, an output shaft with exterior helical grooves, a first set of rollers in rolling engagement with only the body grooves and axially skewed at an angle corresponding to the lead angle of the body grooves, a second set of rollers in rolling engagement with only the output shaft grooves and axially skewed at a skew angle corresponding to the lead angle of the output shaft grooves, and an axially reciprocating piston sleeve mounted within the body and retaining the rollers in fixed axial and circumferential position relative to the piston sleeve during powered operation of the device. In several embodiments, the first and second sets of rollers are axially spaced apart.

93 Claims, 15 Drawing Sheets

U.S. PATENT DOCUMENTS

| | | | |
|---|---|---|---|
| 3,333,483 | 9/1967 | Maci et al. | 74/424.8 |
| 3,406,584 | 10/1968 | Roantree | 74/424.8 |
| 3,508,452 | 4/1970 | Roantree | 74/424.8 |
| 3,554,457 | 1/1971 | Hutzenlaub | 384/504 |
| 3,577,796 | 5/1971 | Eissfeldt | 74/459 |
| 3,585,869 | 6/1971 | Lemor | 74/89.15 |
| 3,595,094 | 7/1971 | Lemor | 74/89.14 |
| 3,638,507 | 2/1972 | Orner | 74/424.8 |
| 3,670,583 | 6/1972 | Leming | 74/89.15 |
| 3,847,033 | 11/1974 | Toth | 74/459 |
| 3,861,226 | 1/1975 | Stanley | 74/89.15 |
| 3,965,761 | 6/1976 | Stanley | 74/89.15 |
| 4,022,076 | 5/1977 | Metz | 74/441 |
| 4,033,194 | 7/1977 | Stanley | 74/89.15 |
| 4,036,074 | 7/1977 | Bodnar | 74/409 |
| 4,050,319 | 9/1977 | Stanley | 74/89.15 |
| 4,276,003 | 6/1981 | Perkins et al. | 417/415 |
| 4,313,367 | 2/1982 | Weyer | 92/33 |
| 4,369,011 | 1/1983 | Ploss | 411/223 |
| 4,409,888 | 10/1983 | Weyer | 92/31 |
| 4,425,009 | 1/1984 | Fillon et al. | 384/504 |
| 4,493,614 | 1/1985 | Chu et al. | 417/22 |
| 4,576,057 | 3/1986 | Saari | 74/424.8 |
| 4,590,816 | 5/1986 | Weyer | 92/33 |
| 4,603,616 | 8/1986 | Zajac | 92/33 |

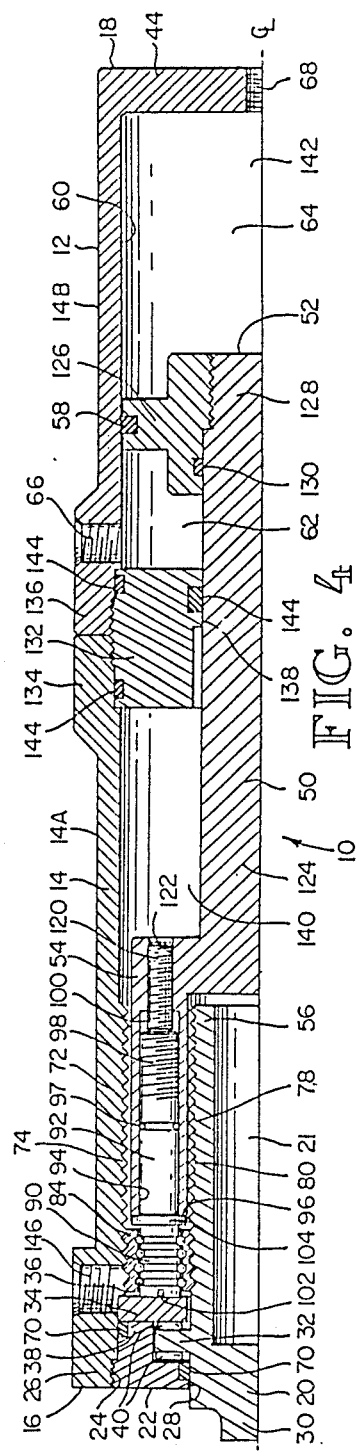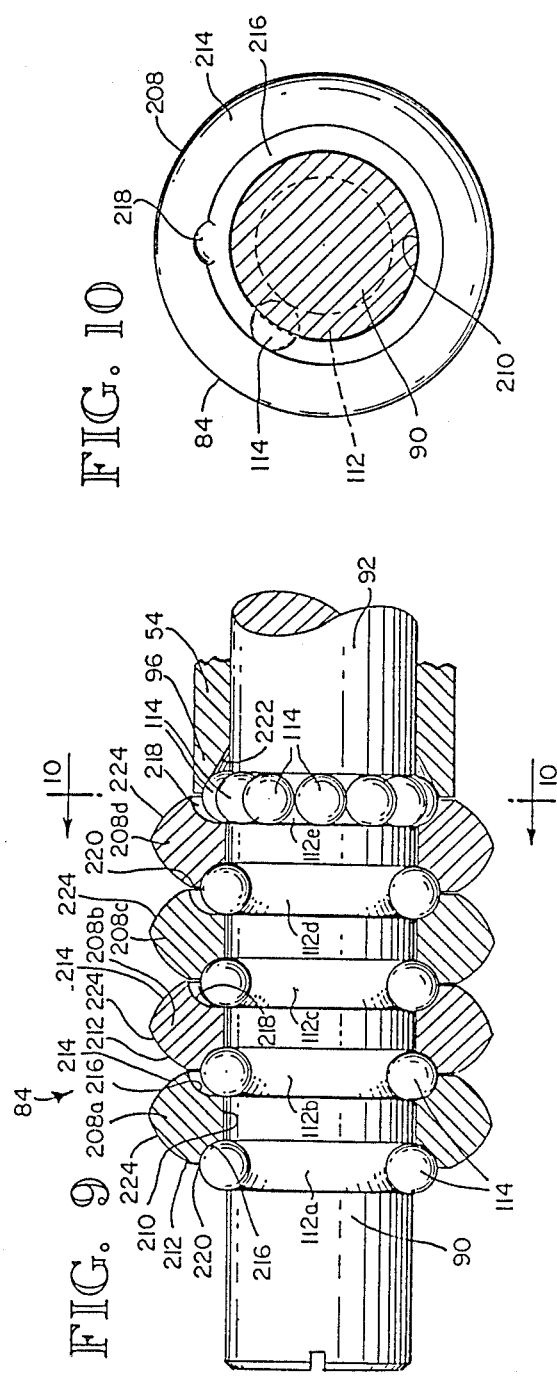

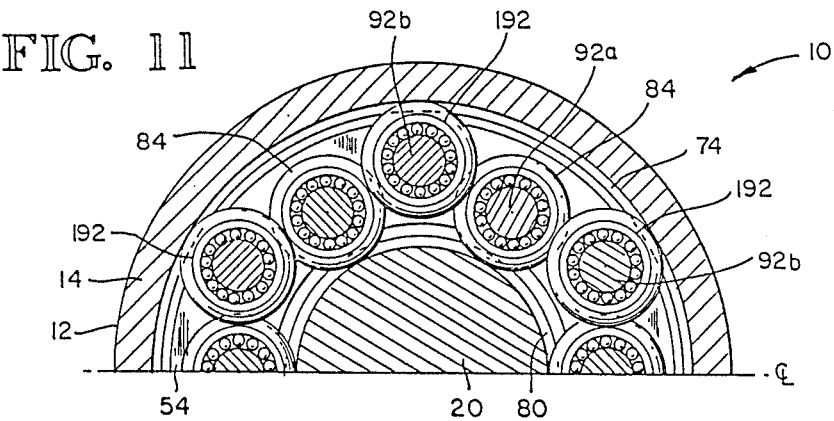
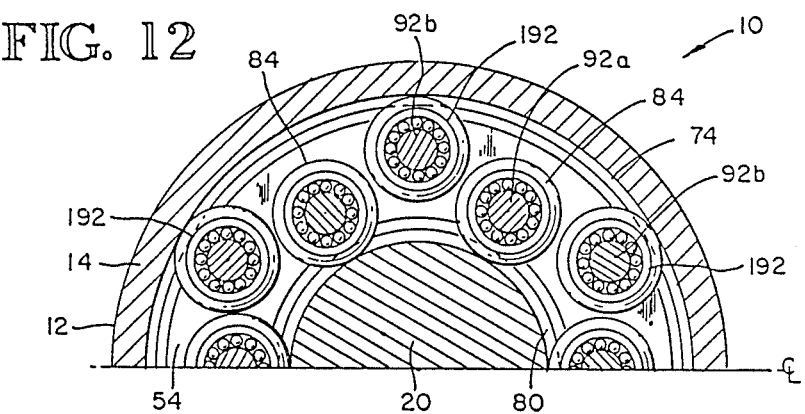
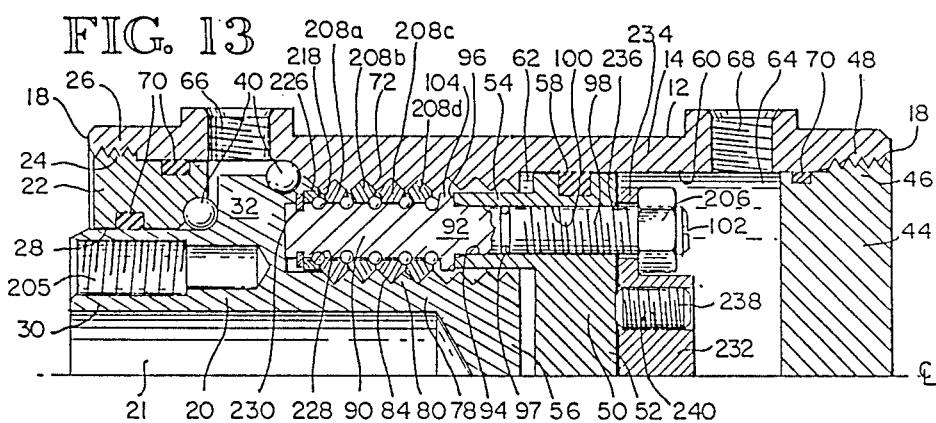

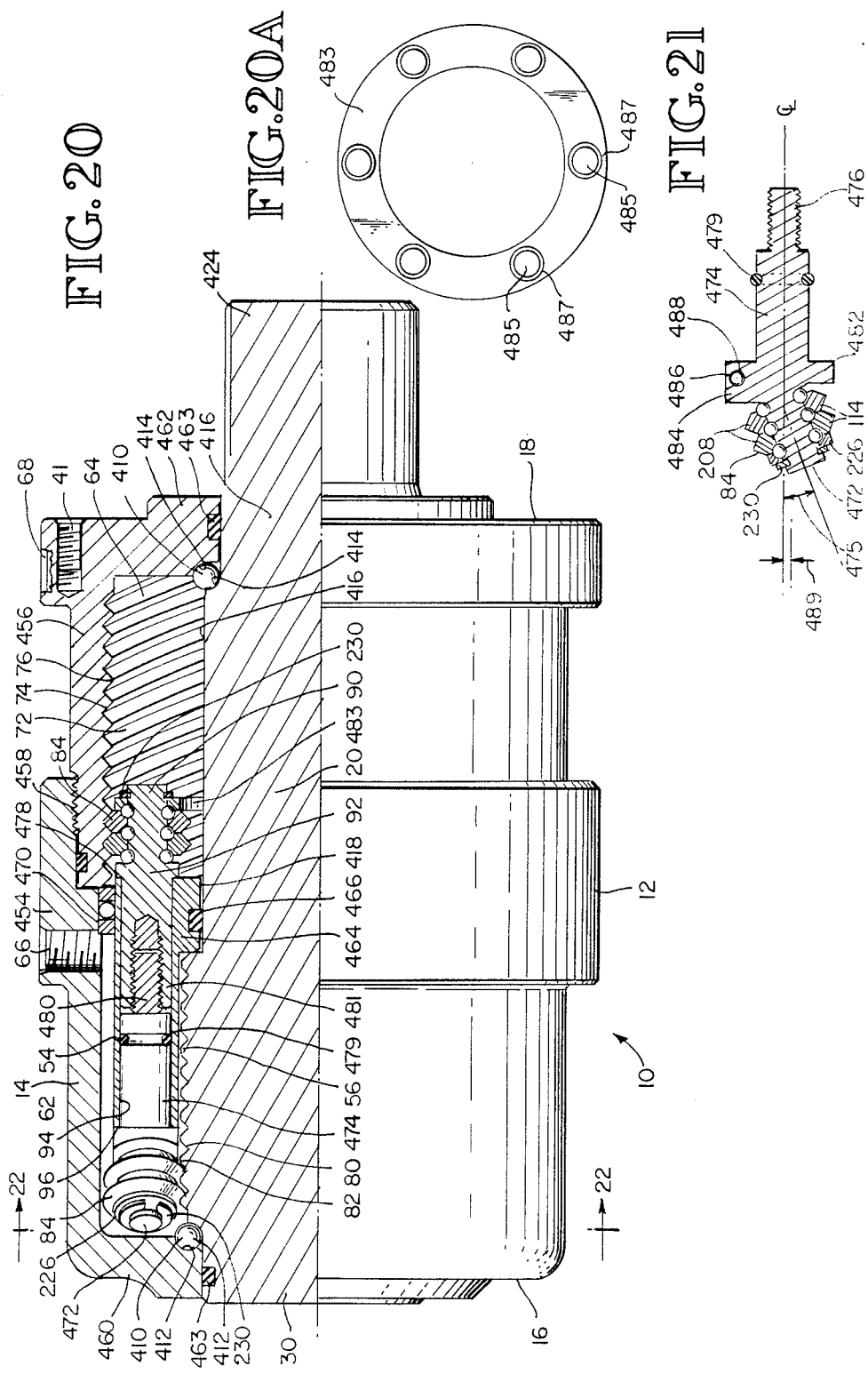

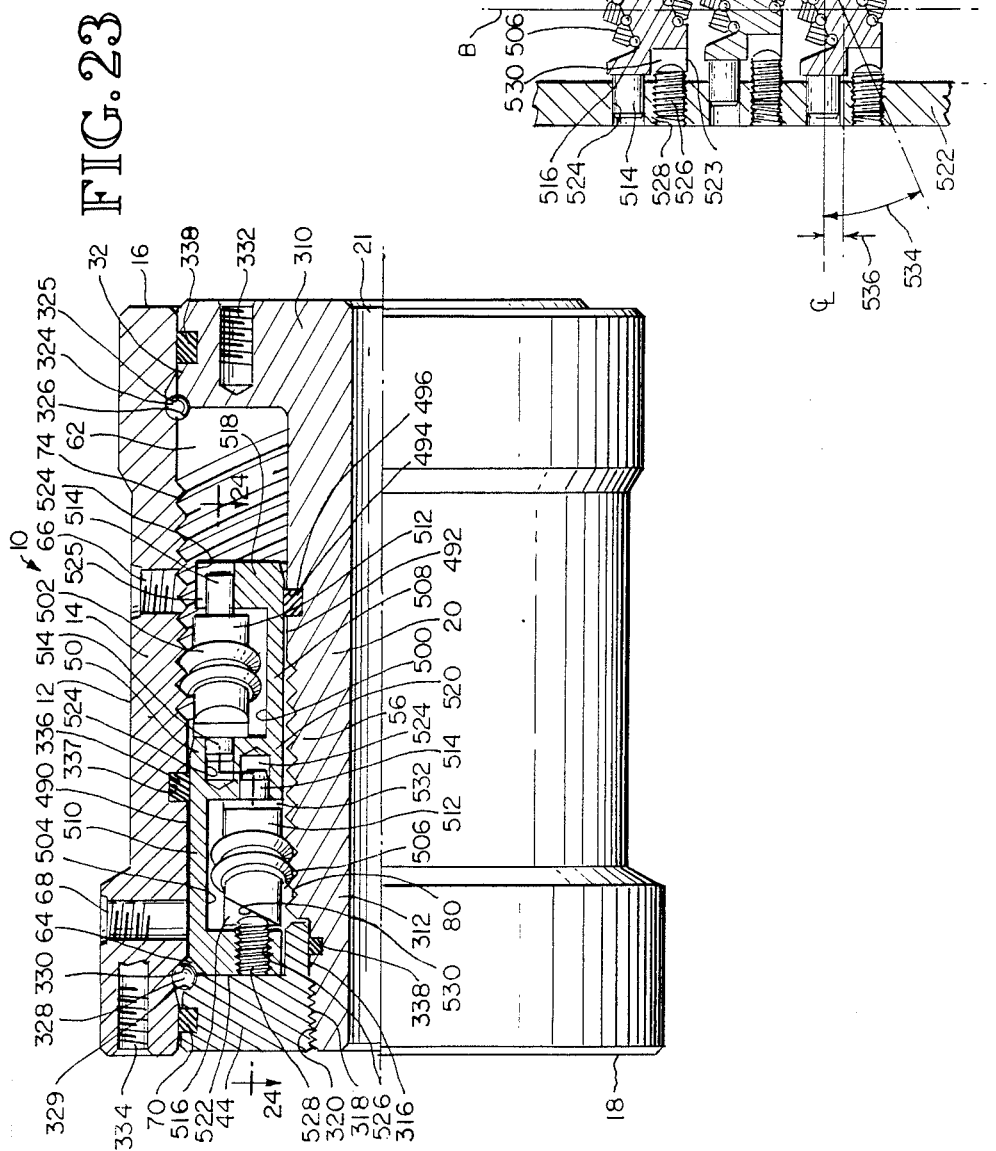

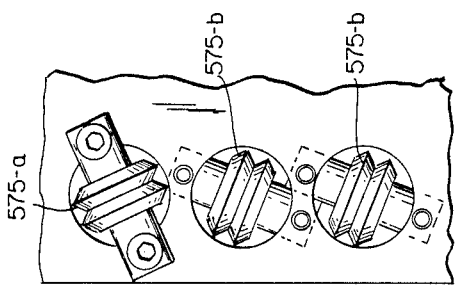
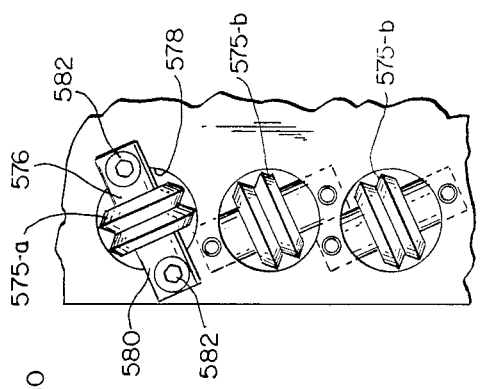
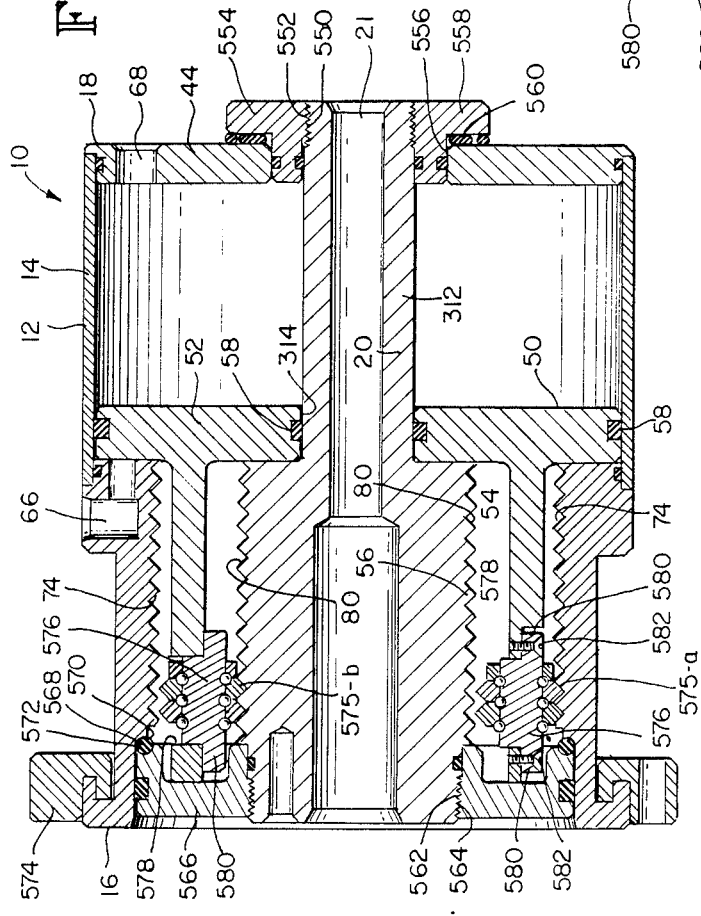

FLUID-POWER DEVICE WITH ROLLERS

CROSS REFERENCES TO RELATED APPLICATIONS

This is a continuation-in-part application of applications Ser. No. 931,223, filed Nov. 14, 1986; Ser. No. 881,904, filed July 3, 1986; Ser. No. 662,256, filed Oct. 17, 1984; Ser. No. 692,293, filed Jan. 17, 1985; and Ser. No. 803,954, filed Dec. 2, 1985; which are continuation-in-part applications of application Ser. No. 575,228, filed Jan. 30, 1984, now issued as U.S. Pat. No. 4,590,816.

TECHNICAL FIELD

The present invention relates generally to actuators and other fluid power devices such as pumps, and more particularly, to fluid-power devices of the type in which axial movement of a piston results in or is produced by relative rotational or linear movement between a body and an output member.

BACKGROUND OF THE INVENTION

Rotary helical splined actuators have been employed in the past to achieve the advantage of high-torque output from a simple linear piston-and-cylinder drive arrangement. The actuator typically uses a cylindrical body with an elongated rotary output shaft extending coaxially within the body, with an end portion of the shaft providing the drive output. An elongated piston sleeve is disposed between the body and the shaft and coaxially receives the shaft therein. The piston sleeve has a sleeve portion splined to cooperate with corresponding splines on the body interior and the output shaft exterior. The piston sleeve is reciprocally mounted within the body and has a head for the application of fluid pressure to one or the other opposing sides thereof to produce axial movement of the piston sleeve.

As the piston sleeve linearly reciprocates in an axial direction within the body, the outer splines of the sleeve portion engage the splines of the body to cause rotation of the sleeve portion. The resulting linear and rotational movement of the sleeve portion is transmitted through the inner splines of the sleeve portion to the splines of the shaft to cause the shaft to rotate. Bearings are typically supplied to rotatably support one or both ends of the shaft relative to the body.

While such an arrangement produces a relatively high-torque output, the capability of the actuator is inherently limited by the use of splines. Splines having certain characteristic limitations relating to the number of turns, pitch, surface contact drag and free play between the corresponding splines which limit the axial and radial loads that the shaft can be subjected to and the operating efficiency of the actuator For high-torque, high-efficiency applications, the rigid splined helical actuators have been found to have an undesirably high frictional coefficient and large loads can cause binding between the corresponding spline. While actuators using balls to transmit torque have been manufactured and are an improvement upon the splined actuator, further improvement is desirable.

It will therefore be appreciated that there has been a significant need for a fluid-powered actuator and other devices such as pumps which are capable of handling increased axial and radial shaft loads while decreasing the weight and size of the device and decreasing the difficulty and expense of manufacturing the device. The device should have a low friction design lo increase efficiency, an uncomplicated and strong design to increase reliability, and be usable for heavy duty applications. Preferably the device will provide a higher output efficiency by using force transmission components producing rolling friction which is less than the sliding friction of splines. At least some embodiments should provide backlash elimination adjustment means to reduce the need for exceptionally accurate machining, to facilitate easy assembly of the device, and to eliminate the slack that produces backlash after the device is assembled. The present invention fulfills these needs and further provides other related advantages.

DISCLOSURE OF THE INVENTION

The present invention resides in a fluid-power device, with a body having a plurality of helical grooves with ridges therebetween formed on an inward facing surface portion thereof; an axially extending drive member supported for rotational or axial movement relative to the body and connectable to an external device, the drive member having a plurality of helical grooves with ridges therebetween formed on an outward facing surface portion thereof; a plurality of elongated rollers having circumferential grooves with ridges therebetween; and an axially reciprocating member reciprocally mounted within the body and rotatably retaining the rollers in fixed axial and circumferential position relative to the reciprocating member during powered operation of the device. The rollers are retained by the reciprocating member in a circumferentially distributed arrangement with at least a first plurality of the rollers in seated engagement with the grooved body inward surface portion, and at least a second plurality of the rollers in seated engagement with the grooved drive member outward surface portion for transmitting force between the body, drive member and reciprocating member. At least the first or second plurality of rollers are retained in an axially skewed position relative to the body or drive member with which engaged by a skew angle generally corresponding to the lead angle thereof. The device further includes at least one piston mounted for reciprocal movement and operatively engaging the reciprocating member.

The first and second pluralities of rollers are in fixed radial and circumferential position relative to the reciprocating member with the first rollers being axially positioned spaced away from the grooved drive member outward surface portion and radially positioned to engage the grooved body inward surface portion, and the second rollers being axially positioned spaced away from the grooved body inward surface portion and radially positioned to engage the grooved drive member outward surface portion. In one embodiment, the first and second rollers are axially spaced apart at opposite ends of the piston sleeve.

In another embodiment, the first and second pluralities of rollers are positioned next to each other. Circumferentially adjacent ones of the first or second plurality of rollers are axially offset relative to each other to allow variation in the number of grooves used.

Each of the spindles may be supported by a coaxially extending support arm disposed in an angularly skewed aperture in the piston sleeve or may be supported by an eccentric support arm. In another embodiment, the spindles are mounted at a skew angle in a window formed in the piston sleeve.

The device further includes means for selectively and adjustably axially moving the spindles in a direction within at least a limited range to axially move the rollers rotatably retained thereon relative to the rollers rotatably retained on the other of the spindles to eliminate backlash.

Other features and advantages of the invention will become apparent from the following detailed description, taken in conjunction with accompanying drawings.

BRIEF DESCRIPTION OF THE DRAWINGS

FIG. 3 is an isometric view of a circumferentially grooved roller of the type used in the actuator of FIG. 1.

FIG. 4 is a partial side elevational, sectional view of an alternative embodiment of the invention similar to the embodiment of FIG. 1 but with the fluid compartments separated from the force-transmitting parts.

FIG. 9 is an enlarged, fragmentary side elevational, partially sectional view of a roller of the type used in the actuator of FIG. 7.

FIG. 10 is a sectional view taken substantially along the line 9—9 of FIG. 9.

FIG. 11 is a partial end elevational, sectional view of an alternative embodiment of the actuator of FIG. 7 using engaged idler and main rollers.

FIG. 12 is a partial end elevational, sectional view of yet another alternative embodiment of the actuator of FIG. 7 using disengaged idler and main rollers.

FIG. 13 is a partial side elevational, sectional view of an alternative embodiment of the invention using a locking end plate.

FIG. 20 is a side elevational, partial sectional view of another embodiment of the invention utilizing cantilevered axially skewed rollers.

FIG. 20A is a reduced size, end view of a spindle support plate used in the embodiment of FIG. 20, shown removed from the actuator.

FIG. 21 is a side elevational, sectional view of a roller/spindle unit used in the embodiment of FIG. 20.

FIG. 23 is a side elevational, partial sectional view of another embodiment of the invention utilizing axially skewed rollers supported at both ends with the rollers being positioned within a pair of circumferential recesses.

FIG. 24 is a schematic fragmentary drawing of several of the axially skewed rollers of FIG. 23 with the annular piston sleeve shown in planar representation.

FIG. 25 is a side elevational sectional view of yet another alternative embodiment of the invention utilizing axially skewed rollers, with the rollers disposed in windows in the piston sleeve.

FIG. 26 a fragmentary view of three rollers of the actuator of FIG. 25 having a particular axially skewed orientation.

FIG. 27 is a fragmentary view of the same three rollers of the actuator of FIG. 25 with two rollers for engaging the shaft having a different axially skewed orientation.

BEST MODE FOR CARRYING OUT THE INVENTION

Figure 1:
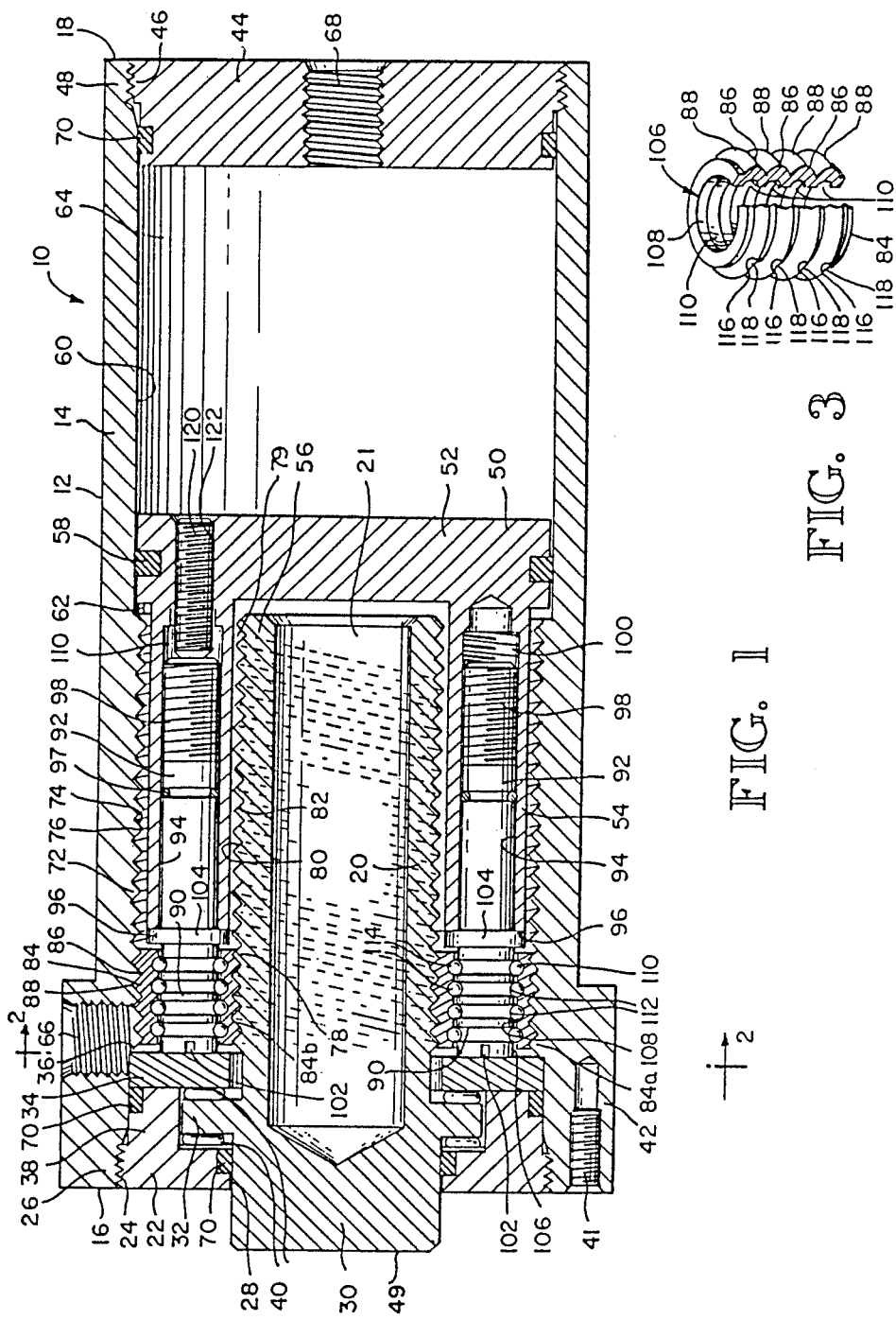
FIG. 1 is a side elevational, sectional view of a fluid-powered roller rotary actuator embodying the present invention, taken substantially along the line 1—1 of FIG. 2.

As shown in the drawings for purposes of illustration, the present invention is embodied in a fluid-power device. A first embodiment of the device is a rotary actuator 10 shown in FIGS. 1 and 2. The actuator 10 includes an elongated housing or body 12 having a cylindrical sidewall 14 and first and second ends 16 and 18, respectively. An elongated rotary output shaft 20 having a hollow center bore 21 is coaxially positioned within the body 12 and supported for rotation relative to the body.

An annular first end cap 22 is positioned at the first body end 16 and has a threaded outer perimeter portion 24 threadably attached to a threaded end portion 26 of the body 12. The first end cap 22 has a central aperture 28 to receive an axially outward end portion 30 of the shaft 20. The shaft 20 has a radially outward extending flange portion 32 positioned toward the first body end 16 between the end cap 22 and a stop ring 34. The stop ring 34 is held in place in the body 12 against axial movement by an interior axially outward facing stop shoulder 36 of the body and an axially inward projecting cylindrical flange portion 38 of the first end cap 22. The shaft 20 is rotatably held in place against axially thrust by thrust bearings 40 disposed between the shaft flange portion 32 and the stop ring 34 and between the shaft flange portion and the end cap flange portion 38. A second end cap 44 is positioned at the second body end 18 and has a threaded outer perimeter portion 46 threadably attached to a threaded end portion 48 of the body 12.

The shaft end portion 30 has a splined shaft extension 49 for coupling to an external device (not shown), however, any conventional means of attachment may be used. The body 12 is adapted for attachment to a stationary support frame (not shown), by a plurality of threaded recesses 41 circumferentially spaced about a radially outward flanged portion 42 of the body sidewall 14. It is to be understood that the invention may be practiced with the shaft 20 rotatably driving an external device, or with the shaft being held stationary and the rotational drive being provided by rotation of the body 12.

A piston sleeve 50 is coaxially and reciprocally mounted within the body 12 coaxially about the shaft 20. The piston sleeve 50 has a head portion 52 positioned toward the second body end 18, and a cylindrical sleeve portion 54 fixedly attached to the head portion and extending axially therefrom toward the first body end 16. The shaft 20 has an axially inward end portion 56 which extends axially toward the second body end 18 to within the sleeve portion 54, but terminates short of the head portion 52.

The head portion 52 carries conventional seals 58, disposed between the head portion and a corresponding interior smooth wall portion 60 of the body sidewall to define fluid-tight compartments 62 and 64 to each side of the head portion toward the first body end 16 and the second body end 18, respectively. The smooth sidewall portion 60 of the body sidewall has sufficient axial length to accommodate the full stroke of the head portion 52 within the body 12.

Reciprocation of the piston sleeve 50 within the body 12 occurs when hydraulic fluid or air under pressure selectively enters through one or the other of a port 66 located in the sidewall 14 and a port 68 located in the second end cap 44. As used herein "fluid" will refer to hydraulic oil, air or any other fluid suitable for use in the actuator 10. The ports 66 and 68 each communicates with one of the fluid-tight compartments 62 and 64, respectively. Conventional seals 70 are disposed between the first and second end caps 22 and 44 and the body 12 and between the shaft end portion 30 and the first end cap 22 to prevent fluid leakage from the compartments.

The application of fluid pressure to the compartment 62 produces axial movement of the piston sleeve 50 toward the second body end 18. The application of fluid pressure to the compartment 64 produces axial movement of the piston sleeve 50 toward the first body end 16. The actuator 10 provides relative rotational movement between the body 12 and the shaft 20 through the conversion of linear movement of the piston sleeve 50 into rotational movement of the shaft, as will be described in more detail below.

An inward facing surface portion 72 of the body sidewall 14 toward the first body end 16 has cut therein a plurality of helical grooves 74 having the same lead angle and a uniform lead and axial pitch. The helical body grooves 74 extend about the sidewall 14 and have helical ridges 76 therebetween.

An outward facing surface portion 78 of the shaft end portion 56 has cut therein a plurality of helical grooves 80 having the same lead angle and a uniform lead and axial pitch. The helical shaft grooves 80 extend about the shaft 20 and have helical ridges 82 therebetween. The outward shaft surface portion 78 is located generally opposite the grooved inward body surface portion 72 and spaced apart radially inward therefrom to define a circumferential space 79 therebetween.

The helical body grooves 74 have an opposite hand or direction of turn from the helical shaft grooves 80, but have substantially the same axial pitch as the helical shaft grooves 80. In the embodiment of FIG. 1, the helical body grooves 74 are left hand, and the helical shaft grooves 85 are right hand. As will be discussed in more detail below, the number of grooves or groove starts comprising the plurality of helical body and shaft grooves 74 and 80 varies from design to design, but preferably the numbers used are interrelated. The grooved inward body surface portion 72 has a first pitch diameter (PD1) and a first lead (L1), and the grooved outward shaft surface portion 78 has a second pitch diameter (PD2) and a second lead (L2), with the pitch diameters and helical groove leads sized substantially according to the relationship:

$$PD1/PD2 = L1/L2$$

This relationship causes free rolling of a plurality of rollers 84 disposed in the circumferential space 79, as will be described below, in that the shaft rotation which results from the planetary action precisely matches the shaft rotation which results from the rollers rolling along the helical body and shaft grooves 74 and 80. While this design is preferred since it eliminates any scuffing or slippage of the rollers 84 as the actuator 10 operates, and thus eliminates sliding friction and achieves the benefit of rolling friction, the actuator may be manufactured without the components perfectly matched, such that while the rollers do roll they also tend to slide somewhat.

As used herein "lead angle" is the helix angle of a helical groove, "lead" is the linear advance resulting from one full revolution along a helical groove, "pitch" is the axial distance between adjacent helical grooves, and "pitch diameter" is the diameter of the grooved part measured from the groove half-depth position.

The actuator 10 is provided with a set of elongated force transmitting rollers 84 disposed in a circumferentially aligned row in the circumferential space 79 between the grooved inward body surface portion 72 and the grooved outward shaft surface portion 78. As best shown in FIG. 3, the rollers 84 each have cut in the outward facing surface thereof a plurality of circumferential grooves 86 with circumferential ridges 88 therebetween. The circumferential grooves 86 extend about the roller 84 in parallel spaced apart radial planes. The circumferential grooves 86 of the rollers 84 have substantially the same axial pitch as the helical body and shaft grooves 74 and 80. The rollers 84 have a pitch diameter (PD3) sized based upon the first pitch diameter PD1 of the grooved inward body surface portion 72 and the second pitch diameter PD2 of the grooved outward shaft surface portion 78, substantially according to the relationship:

$$PD3 = (PD1 - PD2)/2$$

Figure 2:
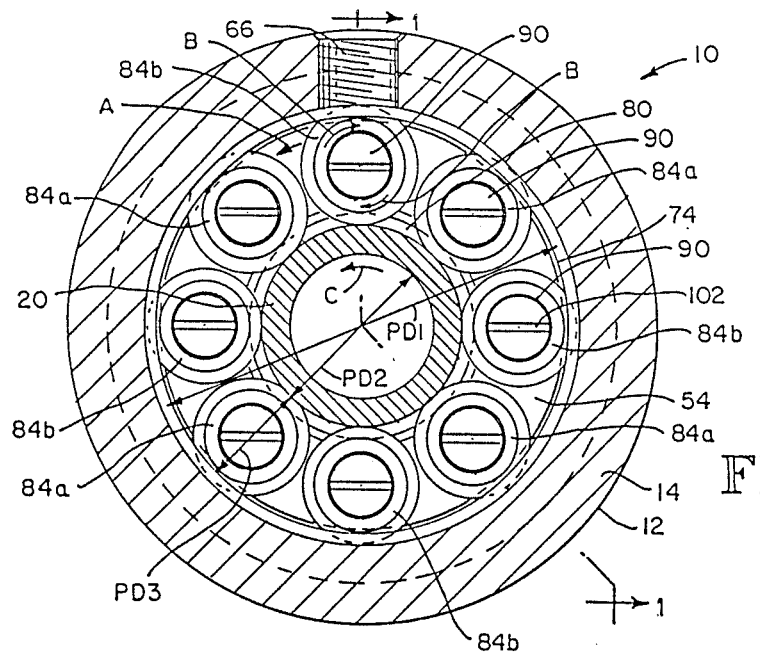
FIG. 2 is a sectional view of the actuator taken substantially along the line 2—2 of FIG. 1.

The relationship of the pitch diameters is best illustrated in FIG. 2.

If desired, the circumferential grooves 86 and ridges 88 of the rollers 84 may be axially spaced apart to skip certain of the helical body and shaft grooves 74 and 80. When using rollers with the same axial position within the actuator (i.e., with the corresponding ridges 88 of each roller in the same plane), the number of grooves on the shaft must be equal to the number of rollers or must be an integer multiple thereof, assuming the rollers are circumferentially distributed with equal inter-roller spacing. For example, if there are eight rollers or at least eight equally spaced roller positions, the shaft must have 8, 16, 24 or 32 grooves, etc. In any event, the groove spacing of the roller must correspond to the axial pitch or groove spacing of the shaft and body with which the roller grooves mesh. As will be described below, in alternative embodiments shown in FIGS. 14, 15 and 16, the rollers 84 may be axially offset to permit further flexibility in the selection of the number of shaft and body grooves which can be used for a particular number of rollers.

The rollers 84 are rotatably retained in fixed axial and circumferential position relative to the piston sleeve 50 as the piston sleeve reciprocates within the body 12 during fluid-powered operation of the actuator 10 by a plurality of cylindrical shaft spindles 90. Each of the spindles 90 has a coaxially extending and integrally formed support arm portion 92. The support arm portions 92 are disposed in a plurality of bore holes 94 formed in an axially outward end wall 96 of the sleeve portion 54 facing toward the first body end 16. The bore holes 94 are evenly circumferentially spaced-apart about the sleeve portion 54 and axially extending fully through the sleeve portion 54 and the head portion 52, and O-ring seals 97 are provided in grooves in the support arm portions 92 to prevent fluid leakage between the compartments 62 and 64.

The support arm portion 92 has an exterior threaded end portion 98 threadably received in an interior threaded end portion 100 of its corresponding bore hole 94. The support arm threaded end portion 98 may be threaded into the bore hole threaded end portion 100 by turning the spindle 90 using a slot 102 cut in the axial end face thereof. The support arm portion 92 has a radially outward extending flange 104 which engages the sleeve portion end wall 96 when the support arm portion is fully threaded into the bore hole 94. As will be described below, certain of the support arm portions 92 are adjusted so as to not be fully seated against the flange 104 for backlash elimination purposes.

The spindles 90 project into the circumferential space 79 and hold the rollers 84 restrained against axial movement relative to the spindles for rotation about the spindles on axes in parallel axial alignment with the body 12. The spindles 90 also retain the rollers 84 in circumferentially distributed, spaced apart positions within the circumferential space 79 about the shaft 20 with each of the rollers in seated engagement and coacting with the helical body grooves 74 and the helical shaft grooves 80 for transmitting force between the body 12, the shaft 20 and the piston sleeve 50. Each ridge 88 of the rollers 84 is positioned for rolling travel in corresponding grooves of both the helical body grooves 74 and the helical shaft grooves 80, and the corresponding ridges 88 of adjacent rollers are axially positioned in generally the same plane. As will be described below, in alternative embodiments the rollers can be axially offset from one another.

The spindles 90 are arranged in parallel axial alignment with the body 12 and each have one of the roller 84 coaxially and rotatably retained thereon and restrained against axial movement relative to the spindle. The rollers 84 each have a longitudinally extending coaxial roller bore 106 therethrough for rotatably receiving one of the spindles 90. The axial roller bore 106 is defined by an interior sidewall 108, and the corresponding roller bore sidewall and spindle exterior surface have formed thereon a plurality of confronting and corresponding ball races 110 and 112, respectively, defining a plurality of ball channels extending circumferentially thereabout.

A plurality of balls 114 are seated in each of the ball channels formed by the ball races 110 and 112 to prevent axial movement of the roller 84 relative to the spindle 90 against axial thrust encountered during powered operation while permitting free rotation of the roller on the spindle. Preferably, the circumferential roller ball races 110 are formed on the roller bore sidewall 108 radially inward from and axially positioned corresponding to the circumferential roller ridges 88 so that the cutting of the roller ball races does not adversely affect the roller strength A sufficient number of balls and ball channels must be used to handle extremely large axial loads encountered during operation. The balls 114 can be inserted into the ball channels with the rollers 84 positioned on the spindles 90 using a ball filler hole 116 extending radially through each of the roller ridges 88 and communicating with the corresponding ball race 110. After a sufficient number of balls 114 are inserted through the filler hole 116 to fill the ball race 110, a sealer plug 118 is inserted into the hole to prevent passage of the balls out of the hole during operation of the actuator 10.

As will now be described, linear reciprocation of the piston sleeve 50 produces rotation of the piston sleeve and the shaft 20 through the force-transmitting capability of the rollers 84. As the piston sleeve 50 linearly reciprocates between one or the other axial directions within the body 12 through application of fluid pressure to the fluid-tight compartments 62 and 64, torque is transmitted by the rollers 84 to the piston sleeve through their coaction with the helical body grooves 74. The axial force created by fluid pressure on the head portion 52 causes the rollers to roll along the helical body grooves 74 and transmit torque to the piston sleeve 50. The transmitted torque causes the piston sleeve 50 to rotate as it moves axially. By way of example, since the helical body grooves 74 are left hand, the piston sleeve 50 rotates counterclockwise when viewed from the first body end 16 as the piston sleeve moves from the first body end to the second body end 18 when fluid pressure is applied to the compartment 62 through the port 66, as shown by arrow A in FIG. 2. As the piston sleeve 50 rotates counterclockwise, the rollers 84 roll along the helical body grooves 74 and themselves rotate clockwise, as shown by arrow B.

The resulting linear and rotational movement of the piston sleeve 50 transmits both axial and rotational force to the shaft 20 through the coaction of the rollers 84 with the helical shaft grooves 80. The transmitted force causes the shaft 20 to rotate relative to the body 12 since axial movement of the shaft is restricted by the thrust bearings 40. As such, axial movement of the piston sleeve 50 produced by fluid pressure is converted into relative rotational movement between the body 12 and the shaft 20. The resulting movement when viewed from the body ends is much like the movement of a planetary gear arrangement.

Continuing the example discussed above, since the helical shaft grooves 80 are right hand, the axial movement of the piston sleeve 50 toward the second body end 18 causes the shaft 20 to rotate counter clockwise relative to the piston sleeve, as shown by arrow C in FIG. 2. As the shaft 20 rotates counterclockwise, the rollers 84 roll along helical shaft grooves 80 with a clockwise rotation. Since this is the same roller rotation as caused by the rollers rolling along the helical body grooves 74, no scuffing or slippage of the rollers occurs and the advantage of rolling friction rather than sliding friction is enjoyed As noted above, since both the piston sleeve 50 and the shaft 20 rotate counterclockwise in response to the application of fluid pressure to the compartment 62, the resulting relative rotation between the body 12 and the shaft is the sum of the rotation of the piston sleeve relative to the body and the rotation of the shaft relative to the piston sleeve, It is noted that the rotational directions described above are merely reversed when the piston sleeve 50 moves from the second body end 18 to the first body end 16 when fluid pressure is applied to the compartment 64 through the port 68. It is further noted that it is necessary to utilize the opposite hand turn for the helical body and shaft grooves with the embodiment of the invention shown in FIG. 1 to avoid the rollers 84 scuffing or slipping as a result of the rollers tending to rotate in one direction due to the piston sleeve rotation and opposite direction due to the shaft rotation, If the rollers do not roll with the surfaces they engage, they will slide with respect to the surface and produce disadvantageous sliding friction much like that of splines. Thus, the sometimes advantageous arrangement of using the same hand turn for the helical body and shaft grooves to produce differential rotation is not possible while achieving the benefit of rolling friction. This problem has, however, been overcome in alternative embodiments of the invention shown in FIGS. 7, 11 and 12 which will be described in detail below.

Still referring to the embodiment of FIG. 1, the actuator 10 is provided with means for eliminating backlash in the force-transmitting parts and for axially preloading of the piston sleeve 50 and the rollers 84. Backlash results for the slack or free movement between the force-transmitting parts of the actuator The slack is usually due to the sizing of the grooves of the body 12, piston sleeve 50, and shaft 20, and the rollers 84 positioned therein, which transmit force between the body and the shaft through the piston sleeve. Backlash occurs as the piston sleeve 50 moves from one axial direction to the other within the body as it reciprocates. As previously described, the spindle support arm portion 92 has a threaded end portion 98 threadably received in an interior threaded end portion 100 of the sleeve bore hole 94. Circumferentially alternate support arm portions 92 are fully threaded into the sleeve 54 with the flange in seated engagement with the sleeve portion end wall 96, and not moved. Preferably every other of the support arm portions 92 is intended to be selectively and adjustably movable in their sleeve bore holes 94 for the purpose of backlash elimination prior to commencing fluid powered operation. The adjusting axial movement of every other of the support arm portions 92, and thus the spindles 90 extending therefrom and the rollers 84 rotatably retained thereby, relative to the stationary support arm portions, and thus the spindles extending therefrom and the rollers rotatably retained thereby, tends to eliminate backlash by reducing the slack between the rollers and the helical body and shaft grooves 74 and 80 which coact with the rollers. When all slack between either the rollers and the helical body grooves or the rollers and the shaft grooves has been eliminated, further axial adjustment will apply an axial preloading force on the piston sleeve and the rollers.

The rollers 84 associated with the support arm portions 92 which are maintained stationary with respect to the piston sleeve 50 are designated in FIGS. 1 and 2 by the reference numeral 84a, while the rollers associated with the support arm portions which are adjustably moved with respect to the piston sleeve to eliminate backlash are designated 84b. To lock the support arm portions 92 in position once axially adjusted to eliminate backlash, each adjusted support arm portion is provided with a locking set screw 120 extending through a threaded bore hole 122 in the head portion 52 and into the sleeve bore hole 94. The set screw 120 engages and applies an axial outward locking force to the end of the support arm portion 92. Should usage of the actuator 10 cause wear of the grooves or the rollers seated therein, or should slack occur for any other reason, the slack can be removed in the same manner described above by further axial adjustment of the support arm portions.

With the present invention, the grooves may be machined using conventional machining techniques with standard tolerances, and the slack which creates the backlash problem can be eliminated by adjustment prior to fluid-powered operation of the actuator 10. Furthermore, the grooves can be machined with a size to permit easy assembly of the actuator and the slack thereby introduced can be eliminated by adjustment. It is noted that the backlash elimination described will eliminate an equal amount of slack between the rollers and the helical body and between the rollers and the shaft grooves.

For purposes of illustration, two example designs for an actuator 10 according to the present invention are provided.

EXAMPLE 1 in this first example, a body pitch diameter PD1 of 2.875 inches and a shaft pitch diameter pD2 of 1.437 inches (for a 2:1 ratio), both having an axial pitch (P) of 0.1875 inches are selected. Use of 8 rollers and 8 helical shaft grooves 80 are also selected. These values and the number of shaft groove starts and rollers can be varied, however, unless the rollers are axially offset it is mandatory to utilize the same number of shaft grooves as rollers used assuming circumferential distribution of rollers with equal inter-roller spacing, or to utilize as the number of shaft grooves an integer multiple of the number of rollers used. Since the rollers and the helical body and shaft grooves intermesh, the rollers must have the same axial pitch as the body and shaft grooves.

As noted above, the pitch diameter of the rollers is sized according lo the relationship:

$$PD3 = \frac{PD1 - PD2}{2}$$

and hence the roller pitch diameter pD3 is $$\frac{2.875 - 1.437}{2} = .719 \text{ inches.}$$

Since 8 helical shaft grooves 80 are to be used, the shaft lead L2 is $$8 \times P = 8 \times .1875 = 1.500 \text{ inches.}$$

As also noted above, the pitch diameter and leads of the body and shaft are sized according to the relationship $$\frac{PD1}{PD2} = \frac{L1}{L2}$$

and hence the body lead L1 is $$1.500 \times \frac{2.875}{1.437} = 3.000 \text{ inches.}$$

The number of helical body grooves 74 is therefore equal to:

$$\text{number of shaft grooves} \times \frac{PD1}{PD2} = 8 \times \frac{3}{1.500} = 16$$

As noted above, with the coplanar arrangement of rollers, it is necessary to utilize as the number of helical body grooves 74 an integer multiple of the number of equally spaced roller positions used. Here 8 rollers were selected and thus the number of helical body grooves are twice the number of rollers. It is noted that less than eight rollers can be used leaving one or more of the roller positions vacant, but this would reduce the load carrying ability of the actuator.

With an actuator of the design of example 1, the helical shaft grooves 80 have a lead angle equal to $$\tan^{-1}\left(\frac{L2}{PD2 \times Pi}\right) = \tan^{-1}\left(\frac{1.500}{1.437 \times Pi}\right) = 18.38°$$

and the helical body grooves 74 have the same lead angle $$\tan^{-1}\left(\frac{L1}{PD1 \times Pi}\right) = \tan^{-1}\left(\frac{3.000}{2.875 \times Pi}\right) = 18.38°$$

Since the hand turn of the helical body and shaft grooves 74 and 80 are opposite, the rotation produced is added, and for a one inch piston sleeve stroke (ST) the resultant shaft rotation is equal to:

$$ST \times \left(\frac{1}{L1} + \frac{1}{L2}\right) \times 360° =$$

$$1'' \times \left(\frac{1}{3.000} + \frac{1}{1.500}\right) \times 360° = 360°$$

Or alternatively, for a shaft rotation of 180° the stroke would be 0.500 inches.

EXAMPLE 2

In this second example, a body pitch diameter pD1 of 10.500 inches, a shaft pitch diameter PD2 of 7.000 inches (for a 3:2 ratio), and an axial pitch P of 0.250 inches are selected. Use of 14 rollers and 28 helical shaft grooves are also selected (a multiple of 2). The pitch diameter of the rollers PD3 is $$\frac{PD1 - PD2}{2} = \frac{10.500 - 7.000}{2} = 1.750 \text{ inches.}$$

The shaft lead L2 is $$28 \times .250 = 7.000 \text{ inches.}$$

The body lead L1 is $$7.000 \times \frac{10.500}{7.000} = 10.500 \text{ inches}$$

The number of helical body grooves 74 is therefore equal to $$\frac{L1}{P} = \frac{10.500}{.250} = 42$$

which is a multiple of 3 times the 14 rollers being used The helical shaft and body grooves 80 and 74 have the same lead angle equal to $$\tan^{-1}\left(\frac{L2}{PD2 \times Pi}\right) = \tan^{-1}\left(\frac{7.000}{7.000 \times Pi}\right) = 17.657°$$

The rotation produced for a one inch piston sleeve stroke (ST) is equal to $$ST \times \left(\frac{1}{L1} + \frac{1}{L2}\right) \times 360° =$$

$$1'' \times \left(\frac{1}{10.500} + \frac{1}{7.000}\right) \times 360° = 85.71°$$

Or alternative, for a shaft rotation of 180°, the stroke would be 2.100 inches.

A significant advantage with the present invention is the reduction in machining time and cost by utilizing helical grooves 74 and 80 only on the body 12 and the shaft 20, rather than the four helical grooved surfaces required for force transmission using conventional helical splines or ball races. Cutting of grooves on the piston sleeve 50 has been completely eliminated. As such, the number of helical grooves which must be cut with the expensive and slow precision equipment required to cut helical grooves are reduced, thus reducing the expense and time of manufacture. Moreover, the roller 84 can be simply turned on a lathe to cut their circumferential grooves 86. By utilizing backlash elimination, the parts need not be manufactured to extremely close tolerances, further reducing the expense of manufacture.

In addition to transmitting force, the use of the rollers 84 permit increased axial and radial loading of the shaft 20 when compared with similarly constructed and sized splined actuators, and even ball actuators using balls for force transmission. The increased load carrying ability results, at least in part, from the increased surface contact the rollers provide between themselves and the grooved surfaces of the body and shaft they engage to distribute load. The increased surface contact also results in an actuator of shorter length when compared to a ball actuator of the same load rating since to achieve the same surface contact as provided by a roller, a string of balls must be used with a length much longer than the axial length of the roller. There is also a savings in length when compared with certain ball actuator designs since the rollers travel axially with the piston sleeve and do not require the use of extended length grooves to avoid ball scuffing for adequate performance.

The rollers 84 of the present invention achieve the benefit of reduced friction by using rolling friction, as do balls, rather than the sliding friction of splines, yet the friction reduction over splines can be achieved with rollers using less axial length than balls. Moreover, since the surface contact for rollers is spread over a greater area than with balls, the walls of the grooves with which the rollers coact can be cut thinner while still retaining adequate strength. This also allows the grooves to be placed closer together for more dense packing of the rollers than can be achieved than with balls. As a result of these benefits, the overall actuator weight can be reduced compared to a ball actuator of equivalent power rating and a more reliable actuator produced.

Compared to splines, the rollers also provide the benefit of serving as roller bearing lo reduce frictional drag and to provide aligning support for the body, piston sleeve and shaft. This facilitates easy shaft rotation and reduces shaft binding under extreme loads.

It is to be understood that while the described embodiment of FIG. 1, as well as all embodiments of the invention which will be described hereinafter are described as fluid-powered rotary actuators, devices of the same general construction utilizing the invention may be manufactured for use as linear actuators, fluid pumps, shock absorbers and the like. In the situation of a linear actuator, the shaft 20 is partially or completely restrained against rotation but permitted to move axially relative to the body 12 in response to reciprocation of the piston sleeve 50. In the situations of pumps or shock absorbers, the shaft 20 is rotated as the input member and the resulting reciprocal movement of the piston sleeve 50 causes the head portion 52 to pump fluid through the ports 66 and 68.

For ease of understanding, the components of the alternative embodiments of the invention described hereinafter will be similarly numbered with those of the first embodiment when of a similar construction. Only the differences in construction will be described in detail.

An alternative embodiment of the invention very similar to the embodiment of FIG. 1 is shown in FIG. 4. In this embodiment, the piston sleeve 50 has an elongated, axially extending neck portion 124 extending between the sleeve portion 54 and the head portion 52. The head portion 52 is formed in two pieces, and includes an interiorly threaded ring 126 threadably attached to an exteriorly threaded end portion 128 of the piston sleeve neck 124. The piston head ring 126 carries the seal 58, and a seal 130 is provided between the ring and the neck portion 124 to prevent fluid leakage.

In the embodiment of FIG. 4, the cylindrical sidewall 14 is formed in two parts 14A and 14B securely connected together in fixed relation by an interiorly positioned annular connector plug 132. The connector plug 132 has exterior threads which are threadably attached to a threaded end portion 134 of the sidewall part 14A and a threaded end portion 136 of the sidewall part 14B. The plug 132 has a central aperture 138 through which the neck portion 124 of the piston sleeve 50 slides as the piston sleeve reciprocates. The plug 132 divides the interior of the body 12 into a first chamber 140 to a side of the plug toward the first body end 16 within which the sleeve portion 54 and the spindle 92/roller 84 assembly is positioned, and a second chamber 142 to a side of the plug toward the second body end 18 within which the head portion 52 is positioned. The plug 132 has conventional seals 144 disposed between the plug and the sidewall parts 14A and 14B, and between the plug and the piston sleeve neck portion 124.

The first body chamber 142 is divided by the head portion 52 into the two fluid-tight compartments 62 and 64 with which the ports 66 and 68 communicate. The compartments 62 and 64 are sealed from the second body chamber 140 by the plug 132 and seals 144 to prevent the fluid used to power the actuator 10 from entering the first chamber 140. A port 146 is provided to the first chamber 140 for applying lubrication oil or grease to the force-transmitting compartments contained therein. Except for the separation of the fluid compartment 62 and 64 from the force-transmitting parts, and several other minor changes, the actuator 10 of FIG. 4 is structurally and operatively identical to the actuator of FIG. 1.

Figure 6:
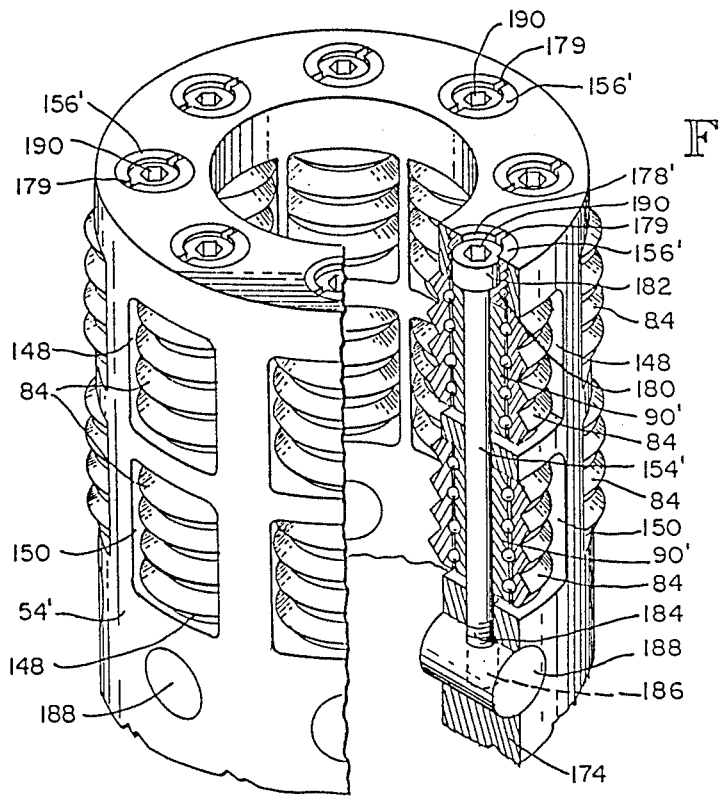
FIG. 6 is an isometric view of an enlarged windowed sleeve of the type used in the actuator of FIG. 5 and showing an alternative backlash elimination adjustment design.
Figure 5:
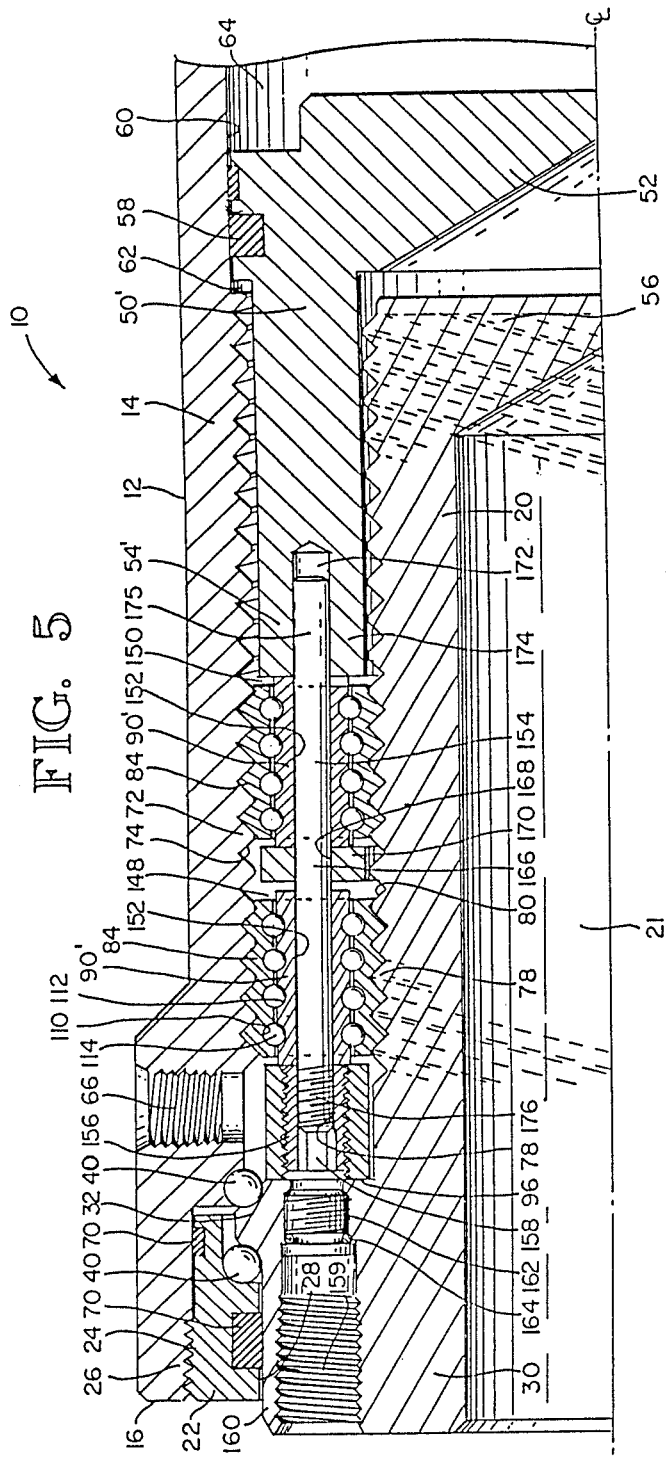
FIG. 5 is a partial fragmentary side elevational, sectional view of another alternative embodiment of the invention utilizing two roller sets for backlash elimination.

In the alternative embodiments of the invention shown in FIGS. 5 and 6, the sleeve portion 54' of the piston sleeve 50 has a first set of circumferentially spaced apart windows or sidewall openings 148 and a second set of circumferentially spaced apart windows or sidewall openings 150. The first set of sidewall openings 148 are axially spaced apart from the second set toward the first body end 16, inward from the outward end wall 96 of the sleeve portion 54'. The first and second sidewall openings 148 and 150 extend fully through the cylindrical sidewall of the sleeve portion 54', and are each sized to receive one of the rollers 84 therewithin. The sidewall of the sleeve portion 54' has a wall thickness sufficiently thin such that the rollers 84 extend radially inward and outward beyond the sidewall to seat in both the helical body and shaft grooves 74 and 80, and coact therewith for transmitting force between the body 12, the shaft 20 and the piston sleeve 50, in the manner described above for the embodiment of FIG. 1. By the use of two sets of rollers 84, the thrust handling capacity of the actuator is effectively doubled.

The rollers 84 are rotatably retained in the sidewall openings 148 and 150 in fixed axial and circumferential position relative to the piston sleeve 50 as the piston sleeve reciprocates within the body 12 during fluid powered operation of the actuator by a plurality of spindles 90'. One spindle 90' is disposed in each of the sidewall openings 148 and 150 in parallel axial alignment with the body 12 and has one of the rollers 84 coaxially and rotatably retained thereon and restrained against axial movement relative to the spindle. The rollers are retained on the spindles 90' in the manner previously described using a plurality of confronting and corresponding ball races 110 and 112 with a plurality of balls 114 seated in each of the ball channels formed by the ball races.

Each sidewall opening 118 of the first set of sidewall openings has a corresponding axially spaced apart sidewall opening 150 of the second set of sidewall openings, with the corresponding sidewall openings having the same circumferential position on the sleeve portion 54' to provide a plurality of pairs of corresponding axially spaced apart sidewall openings. Each of the spindles 90' disposed in the sidewall openings 148 and 150 has a longitudinally extending coaxial spindle bore 152 therethrough for slidably receiving an alignment pin 154. Each alignment pin 154 extends straight through both sidewall openings 148 and 150 of a corresponding pair of axially spaced apart sidewall openings, and through the spindle bore 152 of each of the spindles 90' disposed in the pair of sidewall openings. The alignment pins 154 are restrained by the sleeve portion 54' circumferential and radial movement relative to the sleeve portion, and restrain the spindles 90' against circumferential and radial movement within the sidewall openings 148 and 150.

The sidewall openings 150 of the second set of sidewall openings have an axial length substantially equal to the axial length of the spindles 90' disposed therein, with the axially outward end faces of the spindles engaging the axially inward end walls of the sidewall openings. As such, the rollers 84 retained on the spindles 90' in the sidewall openings 150 are restrained against axial movement in the sidewall openings. The rollers 84 have an axial length less than that of the spindles 90' and hence do not engage the end walls of the sidewall openings and remain free to rotate or the spindles. For backlash elimination purposes, the sidewall openings 148 of the first set of sidewall openings have an axial length sufficiently greater than the axial length of the spindles 90' disposed therein to allow adjustable axial movement of the spindles, and hence the rollers 84 mounted thereon, within at least a limited range.

The actuator 10 further includes a plurality of exteriorly threaded adjustment set screws 156, each threadably and adjustably received in an interiorly threaded set screw bore hole extending between the axially outward facing end wall 96 of the sleeve portion 54' and one of the sidewall opening 148 of the first set of sidewall openings. The set screw 156 projects into the corresponding first sidewall opening 148 and slidably engages an axially outward facing end wall of the spindle 90' disposed therein. The set screws 156 are selectively extendable to exert an adjustable axial force on the engaged spindles 90' to selectively and adjustably axially move the engaged spindle on its alignment pin 154, and thus the roller 84 retained by the spindle, by an amount within the limited range for spindle movement This moves the roller of the engaged spindle relative to the roller retained by the spindle in the axially corresponding sidewall opening 150 of the second set of sidewall openings to reduce the slack between the two rollers and the helical body and shaft grooves 74 and 80 with which they coact and allows axial preloading. A set screw 156 is provided for each axially corresponding pair of sidewall openings.

Each of the set screws 156 is provided with an axially outward opening hexagonal aperture 158 for adjustably turning the set screw with a tool. In this embodiment of the invention, threaded recesses 159 in the shaft end portion 30 are used for attachment of the shaft 20 to an external load. The recesses 159 extend fully through a radially outward extending flange portion 160 of the shaft 20 positioned toward the first body end 16. The recesses 159 are also used to provide access to the set screws 156 within the body 12, and are positioned to correspond to the set screws 156 for their adjustment without disassembling the piston sleeve 50 from the body 12. Each of the recesses 159 is sealed against fluid leakage when not opened for making adjustments by a threaded plug 162 carrying an O-ring 164. The shaft flange portion 32 projects outward from the flange portion 160 and utilizes balls as the thrust bearings 40.

In the embodiment of FIG. 5, the alignment pins 154 each have a smooth shank portion 166 which is slidably disposed in smooth bore 168 extending fully through a sidewall portion 170 of the sleeve portion 54' dividing the pairs of axially corresponding sidewall openings of the first and second sidewall openings 148 and 150. A smooth bore 172 extends from each of the second sidewall opening 150 into an adjacent sidewall portion 174 of the sleeve portion 54' to slidably receive a smooth end portion 175 of the alignment pin 154. The alignment pin 154 is further provided with a distal threaded end portion 176 threadably received in a longitudinally extending, threaded coaxial bore 178 in the corresponding set screw 156. As such, the alignment pin 154 travels with the set screw 156 as it is adjusted axially inward and outward for backlash elimination, with the smooth shank portion 166 and end portion 175 slidably moving in the smooth bores 168 and 172. Alternatively, the adjustment pin may be otherwise fixedly attached to the set screw or be formed as an integral part of the set screw.

The sleeve portion 54' is best shown in FIG. 6 with an alternative arrangement for the alignment pins and set screws. Although otherwise identical in structure and function, the set screws 156' in FIG. 6 have a slot 179 in the axially outward end face thereof for adjustably turning the set screw with a tool and a smooth axial bore 178' with an axially outward facing radial shoulder 180. The alignment pin 154' is slidably received in the set screw bore 178' and has a head 182 engaging the shoulder 180. A distal end portion 184 of the alignment pin 154' is threaded and threadably received in a threaded bore hole 186 formed in a plug 188 extending transversely through the sidewall portion 174 of the sleeve portion 54' With this embodiment, after the set screw 156' is adjusted to eliminate backlash, the set screw can be locked in position by turning the alignment pin 154' with a tool using a hexagonal aperture 190 in the pin head 182 to apply an axially inward force on the set screw through engagement of the head with the set screw shoulder 180.

Figure 7:
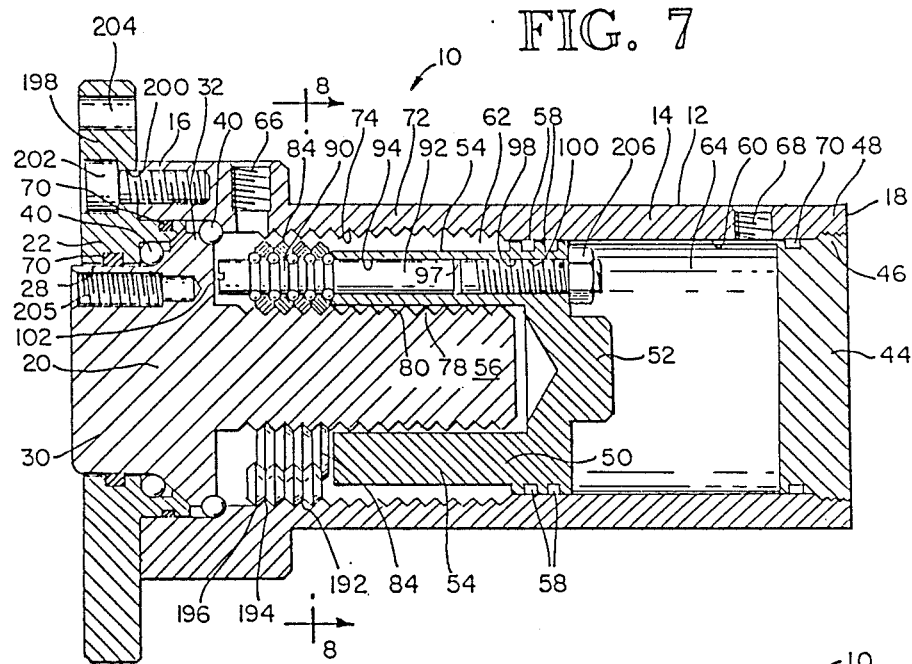
FIG. 7 is a side elevational, sectional view of yet another alternative embodiment of the invention utilizing engaged idler and main rollers.
Figure 8:
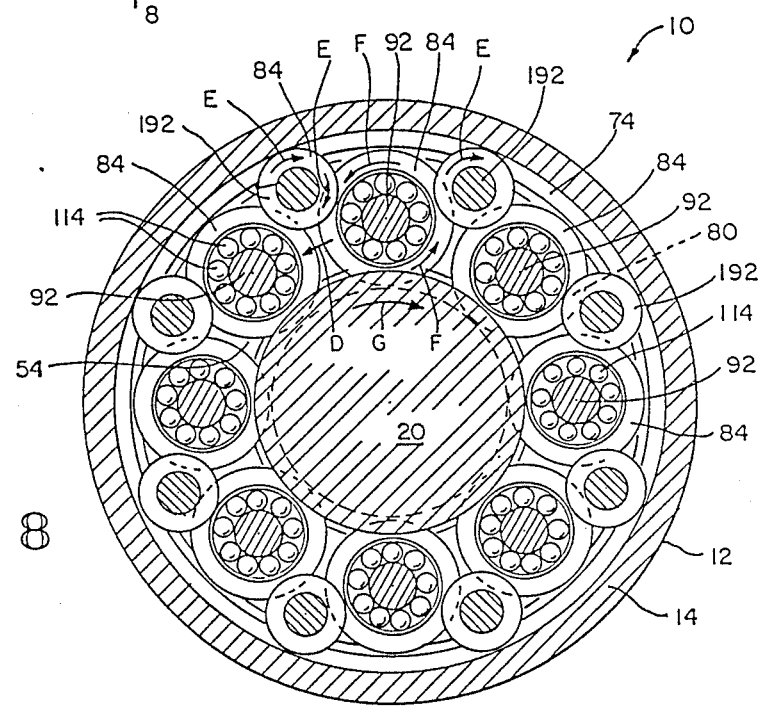
FIG. 8 is an enlarged sectional view taken substantially along the line of 8—8 of FIG. 7.

Another alternative embodiment of the invention is shown in FIGS. 7 and 8. This embodiment is similar to the the embodiment of FIG. 1, except that it is constructed to allow the use of body and shaft helical grooves 74 and 80 having the same hand lo achieve the advantages of differential rotation but without the rollers 84 scuffing and slipping which would result if the same hand helical body and shaft grooves were used for the embodiment of FIG. 1. In this embodiment, the rollers 84 are retained by the spindles 92 in seated engagement with only the helical shaft grooves 80, and are positioned radially inward from the helical body grooves 74 and do not directly contact the body grooves.

The actuator 10, further includes a plurality of elongated idler rollers 192 having circumferential grooves and ridges therebetween with an axial pitch corresponding to the axial pitch of the helical body and shaft grooves and ridges 74, 76, 80 and 82, as do the rollers 84. The idler rollers 192 are distributed in circumferential arrangement between and nested in seated engagement with circumferentially adjacent pairs of the rollers 84 and the helical body grooves 74. The idler rollers 192 are in tight contact with the helical body grooves 74 and two rollers 84, and the rollers 84 are each in tight contact with the helical shaft grooves 80 and two idler rollers. The arrangement of the rollers 84 and idler rollers 192 is best shown in FIG. 8. It is noted that the rollers 84 could be alternatively arranged in engagement with the body grooves, with the idler rollers 192 in engagement with the shaft grooves.

The idler rollers 192 transmit force between the body 12 and the adjacent pair of rollers 84 with which they engage, and each ridge of the idler rollers is positioned for rolling travel in the corresponding grooves of the helical body grooves 74. Although the idler rollers 192 are not rotatably retained on spindles 92 as are the rollers 84, the axial, radial and circumferential position of the idler rollers is in effect fixed relative to the piston sleeve portion 54 since the idler rollers and the rollers 84 have intermeshing circumferential grooves. As such, the idler rollers 192 are axially trapped by and must travel axially with the rollers 84 as the piston sleeve 50 reciprocates within the body 12. Moreover since each of the idler rollers 192 is positioned generally at the center of a triangle defined by the helical body grooves 74 and the adjacent pair of rollers 84 it engages, the radial and circumferential position of the idler roller is fixed relative to the piston sleeve 50.

In the embodiment of FIG. 7, the first end cap 22 is not threaded for attachment to the body 12, as in FIG. 1, but rather has a radially outward extending flange 198 with a plurality of circumferentially spaced apart and recessed holes 200 for receiving bolts 202 for fastening the end cap to the first body end 16. The body 12 is attached to a support frame (not shown) by using a plurality of attachment holes 204 extending through the end cap flange 198. A plurality of threaded recesses 205 are provided in the shaft end portion 30 for attachment of the shaft 20 to an external device (not shown).

In this embodiment, the bore hole 94 extends fully through the sleeve portion 54 and the head portion 52. As before described, the spindle support arm portion 92 has its exteriorly threaded end portion 98 received in the interiorly threaded end portion 100 of the bore hole 94. The threaded end portion 98 of the support arm portion 92 projects out of the bore hole 94 and into the compartment 64. A lock nut 206 is threadably attached to the projecting support arm portion 92 for locking the spindle 90 against rotation during fluid powered operation of the actuator 10 after the axial position of the roller 84 carried thereon has been adjusted to eliminate backlash and axially preloaded.

Much as the operation described above for the embodiment of FIG. 1, linear reciprocation of the piston sleeve 50 produces rotation of the piston sleeve and the shaft 20 through the force-transmitting capability of the rollers 84 and the idler rollers 192. As the piston sleeve 50 reciprocates within the body 12 through application of fluid pressure lo the fluid-tight compartment 62 and 64, torque is transmitted to the piston sleeve 54 through the coaction of the rollers 84 with the idler rollers 192, and through the coaction of the idler rollers with the helical body grooves 74. The axial force created by fluid pressure on the head portion 52 causes the idler rollers 192 to roll along the helical body grooves 74 and transmit torque through the rollers 84 to the piston sleeve 50. The transmitted torque causes the piston sleeve 50 to rotate as it moves axially.

By way of example, if the helical body grooves 74 are left hand, the piston sleeve, rotates counterclockwise, when viewed from the first body end 16, as the piston sleeve 50 moves from the first body end 16 to the second body end 18 when pressure is applied to the compartment 62 through the port 66, as shown by arrow "D" in FIG. 8. As the piston sleeve 50 rotates counterclockwise, the idler rollers 192 roll along the helical body grooves 74 and themselves rotate clockwise, as shown by arrow "E." The rotation of the idler rollers 192 in the clockwise direction imparts a counterclockwise rotation to the rollers 84, as shown by arrow "F."

The resulting linear and rotational movement of the piston sleeve 50 transmits both axial and rotational force to the shaft 20 through the coaction of the rollers 84 with the helical shaft grooves 80. The transmitted force causes the shaft 20 to rotate relative to the body 12 since axial movement of the shaft is restricted by the thrust bearings 40. As such, axial movement of the piston sleeve 50 produced by fluid pressures is converted into relative rotational movement between the body 12 and the shaft 20.

Continuing the example discussed above, if the helical shaft grooves 80 are also left hand to achieve the benefits of differential rotation, the axial movement of the piston sleeve 50 toward the second body end 18 causes the shaft 20 to rotate clockwise relative to the piston sleeve, as shown by arrow "G" in FIG. 8. As the shaft 20 rotates clockwise, the rollers 84 roll along the helical shaft grooves 80 which tends to rotate them counterclockwise. Since this is the same rotational direction for the rollers 84 as caused by the idler rollers 192 rolling along the helical body grooves 74, as described above, no scuffing or slippage of the rollers 84 or the idler rollers 192 occurs. Thus the benefit of rolling friction rather than sliding friction is realized even with the same hand for the helical body and shaft grooves 74 and 80.

Since as described above the piston sleeve 50 rotates counterclockwise and the shaft 20 rotates clockwise in response to the application of fluid pressure to the compartment 62, the resulting relative rotation between the body 12 and the shaft is the difference of the rotation of the piston sleeve relative to the body and the rotation of the shaft relative to the piston sleeve. The differential rotation allows the design of a rotary actuator with less rotary output, but with a longer stroke and thus an increased output torque. This is particularly advantageous when air is used as the fluid to power the actuator since air requires large piston displacements, such as is possible using the long piston stroke produced with differential rotation. It is noted that by use of the idler rollers 192 to transmit force between the rollers 84 and the helical body grooves 74, the rotational direction of the rollers 84 is reversed from what it would be if they were directly contacting the helical body grooves as is the situation with the embodiment of FIG. 1. This results in the rollers 54 and the shaft 20 having compatible rotational directions which produces no scuffing or slippage therebetween as the rollers 84 roll along the helical shaft grooves 80.

Of course, the rotational directions described above are merely reversed when the piston sleeve 55 moves from the second body end 18 to the first body end 16 when fluid pressure is applied to the compartment 64 through the port 68.

In an alternative embodiment shown in FIG. 11, similar to the embodiment of FIGS. 7 and 8, the idler rollers 192 are also retained on spindles identical to those of the roller 84, with the spindles for the rollers 84 indicated by the reference numeral 92a and the spindles for the idler rollers indicated by the reference numeral 92b. The piston sleeve portion 54 has a wall thickness sufficiently thick to accommodate the bore holes 94 for the roller spindles 92a as well as the bore holes for the idler roller spindles 92b which are radially offset outward of the roller spindles 92a in a radially staggered manner. In this embodiment, as in the embodiment of FIGS. 7 and 8, every other roller is an idler roller 192 and the idler rollers are nested in seated engagement with circumferentially adjacent pairs of the rollers 84 and the helical body grooves 74. However, the idler rollers 192 do not rely upon being trapped in this nested arrangement to maintain their axial, radial and circumferential position fixed relative to the piston sleeve portion 54. Since the idler rollers 192 and the rollers 84 mesh, they must have the same or, at least, substantially the same axial pitch.

In an alternative embodiment shown in FIG. 12 idler rollers 192 retained on spindles 92b are used as in the embodiment of FIG. 11; however, unlike the embodiments of FIGS. 7 and 11, the idle rollers are spaced apart from and do not nest with the rollers 84. Instead, the idler rollers 192 are seated engagement with only the helical body grooves 74 and the rollers 84 are in seated engagement with only the helical shaft grooves 80. With this arrangement, the helical body and shaft grooves 74 and 80 may have the same hand to utilize differential rotation or have the opposite hand without realizing roller scuffing or slipping since the rollers 84 and the idler rollers 192 engage only one or the other of the helical body or shaft grooves 74 or 80, and do not mesh with the rollers of the other set. For the same reason the helical body and shaft grooves 74 and 80 may have different pitches. It is noted, however, that forces on the rollers 84 and the idler rollers 192 are not balanced, and since the rollers do not mesh together and support each other, substantial bending stresses can be created in the spindles 92 retaining the rollers. As such, this design of actuator is used for lower loads.

In the embodiments of the actuator shown in FIGS. 7, 11 and 12 the rollers 84 have an alternative roller design. As best shown in FIGS. 9 and 10, the alternative roller design includes four annular roller disks 208 indicated by the reference letters a, b, c and d disposed on the spindle 90 in juxtaposition and operating together to form the roller 84.

Each of the roller disks 208 has a coaxial opening 210 therethrough sized to slide axially on the spindle 90 during assembly and for free rotation of the disk about the spindle during powered operation. Each of the roller disks has first and second axially outward and oppositely facing first and second sidewalls 212 and 214, respectively. The sidewalls 212 and 214 each have an axially outward opening circumferential ball groove 216 formed thereon extending about the central opening 210 of the roller disk 208.

The first and second sidewalls 212 and 214 of each roller disk 208 and the ball grooves 216 formed thereon are axially spaced apart to correspond with the axial positioning of the ball grooves 112 formed on the spindle 90. The roller disks 208 are disposed on the spindle 90 with the second sidewall 214 of one disk in juxtaposition with the first sidewall 212 of the next adjacent disk. As such, the ball groove 216 in the second sidewall 214 of one disk and the ball groove of the first sidewall 212 of the next adjacent disk form the roller ball race 110 which with the corresponding ball race 112 of the spindle 90 forms one of the ball channels containing the roller balls 114. As shown in FIG. 9, the four roller disks 208 a, b, c and d comprising one roller 84 coact with five spindle ball races 112, indicated by the reference letters a, b, c, d and e.

The roller disk ball grooves 216 are cut to form substantially one quarter of the circumferential wall of a ball channel, and as such, each sufficiently overlays the corresponding spindle ball race 112 to retain without assistance the balls 114 in the corresponding spindle ball race. To allow for loading of the balls 114 into the ball race 112 once the roller disk 208 is in position on the spindle 90, a ball loading opening 218 is provided in the second sidewall 214 of the roller disk. The loading opening 218 connects with the ball groove 216 formed in the roller disk second sidewall 214, and extends radially away from the spindle 90 by an amount sufficient to receive and pass balls into the spindle ball race 112 with the roller disk 208 in operative position on the spindle, that is, with the ball groove 216 in its roller disk first sidewall 212 in engagement with the balls 114 disposed in the corresponding spindle ball race 112.

The roller 84 comprised of the roller disks 208 is assembled on the spindle 90 by first loading a set of ball 114 in the axially outermost spindle ball race 112a toward the first body end 16. The first roller disk 208a is then slid along the spindle 90 from its threaded end portion 98 to bring the ball groove 216 in the first sidewall 212 of the roller disk into seated engagement with the balls. This results with the loading opening 218 of the first roller disk 208a facing axially inward toward the second body end 18. Next, another set of the balls 114 is loaded through the loading opening 218 in the second sidewall 214 of the roller disc 208a to fill the corresponding spindle ball race 112b. As just described for the roller disk 208a, the next roller disc 208b is then slid into position with the ball groove 216 in its first sidewall 212 in seated engagement with the balls in the spindle ball race 112b. This assembly procedure is continued until the spindle ball race 112e is loaded with a set of the balls. It is noted that the spindles 90 used in the embodiment of at least FIG. 7 do not have the flange 104 shown with the spindles of FIG. 1.

The first sidewall 212 of each of the roller disks 208 has a radial circumferential flat sidewall portion 220 which is radially positioned to block the ball loading opening 218 in the next adjacent roller disk and prevent balls from exiting therethrough during fluid powered operation of the actuator. Since the endmost roller disk 208d toward the second body end 18 is the last loaded with balls 114 and has no next adjacent roller disk to block its loading opening and maintain the balls loaded in the spindle ball race 112e, the axially outward end wall 96 of the sleeve portion 54 has an inwardly beveled end wall portion 222. In effect, the beveled wall portion 222 forms the missing quarter section of the ball channel with the ball race 216 in the second sidewall portion 214 of the roller disk 208d and with the spindle roller race 112e, and also serves to block the ball loading. opening 218 in the roller disk 208d.

Each of the roller disks 208 has a radially outward facing surface portion 224 shaped to form in combination with the outward facing surface portions of the other roller disks comprising the roller 84, the desired grooves 86 and ridges 88 contour of the roller. While functionally the equivalent of the rollers 84 show in FIG. 3, the rollers of FIG. 9 eliminates the need for the filler holes 116 and sealer plugs 118.

In FIG. 13 another actuator 10 is shown with rollers 84 using four roller disks 208a–d. In this embodiment the spindles 92 employ the flange 104 for seating against the sleeve portion end wall 96, thus preventing the roller disks from sliding onto the spindles from the spindle threaded end portion 98. As such, the orientation of the roller disks 208 on the spindles 92 is reversed with the ball loading openings 218 facing axially outward toward the first body end 16. A retainer ring 226 is mounted on each spindle 90 axially outward of the first roller disk 208a, and has an axially inward opening circumferential ball groove 228 formed thereon which corresponds to the ball groove 216 of the first roller disk. The retainer ring 226 projects radially outward sufficient to block the ball loading opening 218 in the first roller disk 208a. A split ring 230 is seated in a circumferential groove on the spindle 90, axially outward of the retainer ring 226, to hold the retainer ring in place.

The actuator 10 of FIG. 13 has a spindle adjustment arrangement to eliminate backlash similar to that of the embodiment of FIG. 7, except a lock plate 232 is positioned in the compartment 64 adjacent to the piston head portion 52. The lock plate 232 has a circumferentially extending flange 234 with smooth bore holes 236 corresponding in position to the threaded bore holes 94 in the piston sleeve 50. The spindle support arm portion 92 has its exteriorly threaded end portion 98 received in the interiorly threaded end portion 100 of the bore hole 94 projecting out of the bore hole through the corresponding hole 236 in the lock plate 232 and into the compartment 64. The lock nut 206 is threadably attached to the projecting support arm end portion 98. In this embodiment the slot 102 is cut in the axial end face of the threaded end portion 98 on which the nut 206 is attached.

Once the axial positions of the rollers 84 carried on the spindles 90 have been adjusted to eliminate backlash and for axially preloading by turning the spindles using the slots 102, the lock nuts 206 are snuggly tightened against the lock plate flange 234. The lock nuts are not lightened so much, however, as to cause the spindles to rotate, as can inadvertently happen with the spindle locking arrangement of FIG. 7 causing inaccurate backlash settings of the spindles. Once all of the lock nuts 206 are snug to the lock plate flange 234, the actual locking of the spindles against rotation during fluid-powered operation of the actuator 10 is achieved by turning a plurality of circumferentially positioned locking set screws 238 threadably received in threaded bore holes 240 in the lock plate 232. The set screws 238 are turned inward until they engage the piston head portion 152 and apply an axial outward force on &he locking plate 232 toward the second body end 18 and transmit this force as an axially outward locking force on the spindles 90. In such manner, an axial locking force can be applied to the spindles 90 without also applying torque to the spindle support arm portions 92 or the lock nuts 206 which could inadvertently cause rotation of the spindles 90 and change their backlash setting.

Various alternative embodiments of the piston sleeve 50, the spindle 90, the rollers 84 and backlash elimination described and shown in the drawings may be utilized in different combinations within the spirit and scope of the present invention For example, the idler rollers 192 shown in Figure 7 may be utilized with a piston sleeve 50 of the type shown in FIGS. 5 and 6. Moreover, the elongated piston sleeve arrangement shown in FIG. 4 may be used with any embodiment.

Figure 14:
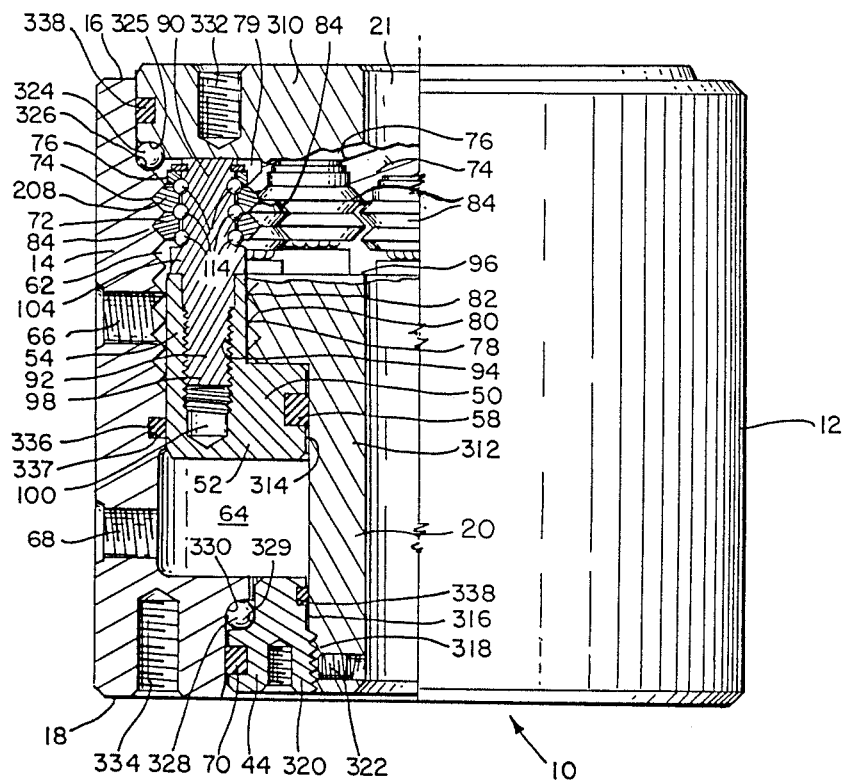
FIG. 14 is a side elevational, partial sectional view of still another embodiment of the invention utilizing axially offset rollers.

Yet another embodiment of the invention very similar to the embodiments of FIGS. 1 and 13 is shown in FIG. 14. In this embodiment the actuator 10 does not utilize a first end cap, but rather the shaft 20 is provided with a flanged portion 310 positioned at the first body end 16. The shaft 20 has a coaxial elongated portion 312 which extends from the shaft end portion 56 (which has cut therein the helical shaft grooves 80) to the second body end 18. The elongated shaft portion 312 projects through a smooth central aperture 314 in the head portion 52 of the piston sleeve 50 to within a threaded central aperture 316 formed in the second end cap 44. The extending shaft portion 312 has a threaded outer portion 318 threadably received within a threaded portion 320 of the central aperture 316 to fixedly attach the second end cap to the shaft for rotation therewith. A locking set screw 322 is provided to lock the end cap 44 in place on the extending shaft portion 312 during fluid powered operation of the actuator.

The shaft 20 is rotatably held in place against axial thrust by thrust bearings 324 disposed between a circumferential ball race 325 formed in the shaft flanged portion 310 and a circumferential ball race 326 formed in the body sidewall 14 toward the first body end 16, and by thrust bearings 328 disposed between a circumferential ball race 329 formed in the second end cap 44 and a circumferential ball race 330 formed in the body 12 toward the second body end 18.

In this embodiment, the shaft flanged portion 310 is provided with a plurality of threaded recesses 332 for attachment of the shaft 20 to an external device (not shown). Similarly, the body 12 is provided with a plurality of threaded recesses 334 at the second body end 318 for attachment of the body to a stationary support frame (not shown). It is noted that in the embodiment of FIG. 14, the piston head portion 52 does not carry an outer seal, but rather a seal 336 is positioned stationary within a groove 337 in the body sidewall 14. Conventional seals 338 are disposed between the second end cap 44 and the extending shaft portion 312, and between the shaft flanged portion 310 and the body sidewall 14 toward the first body end to prevent fluid leakage.

In the embodiment of FIG. 14, the rollers 84 are each comprised of two annular roller disks 208 disposed on spindles 90 of the type shown in FIG. 13. Of particular significance with the embodiment of FIG. 14 is the use of rollers 84 with every other one of the circumferentially distributed rollers being axially offset from the next adjacent roller by preferably one-half the axial pitch of the helical shaft grooves 80. The rollers are still maintained in a balanced arrangement with equal inter-roller spacing. This is to be compared with the rollers in the previously described embodiments which are axially positioned in generally coplanar relation to each other with the ridges 88 of one roller 84 being axially positioned generally co-planar with the corresponding ridges of the adjacent roller.

The alternating axial off-setting of the rollers 84 is accomplished in the embodiment of FIG. 14 by providing the flange 104 of the support arm portion 92 of every other one of the spindles 90 with a thickness in the axial direction greater than the thickness of the flange for the two adjacent spindles by an amount equal to one-half the axial pitch of the helical shaft grooves 80. In such manner, the rollers 84 are rotatably retained in fixed axial and circumferential position relative to the piston sleeve 50 with every other one of the rollers 84 being axially offset toward the first body end 16 by one-half the pitch of the shaft grooves. This permits the rollers to be circumferentially positioned closer together to substantially nest the ridges of one within the grooves of the other, although the rollers are held out of engagement with each other.

Figure 15:
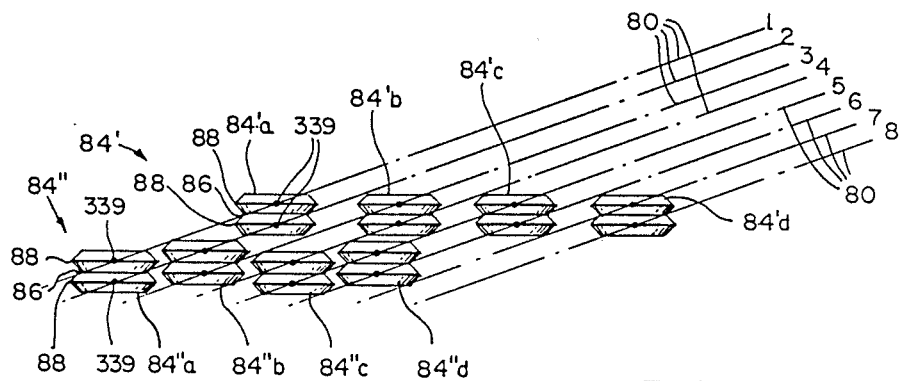
FIG. 15 is a schematic diagram of four of the axially offset rollers of FIG. 14 with the shaft grooves shown in planar representation.

The axially offset positioning of the rollers is shown in the schematic diagram of FIG. 15 compared to an alternative coplanar axially aligned arrangement of rollers, with the coplanar rollers indicated by reference numeral 84' and the axially offset rollers indicated by reference numeral 84". For purposes of illustration, set of four circumferentially adjacent coplanar rollers 84' and a set of four circumferentially adjacent axially offset rollers 84" are shown and indicated with reference letters a, b, c and d. The helical shaft grooves 80 of the shaft 20 are shown with a planar representation for purposes of illustration, with the adjacent grooves being numbered 1 through 8. For clarity, the ridges 82 positioned between adjacent shaft grooves 80 are not shown.

As previously described, the rollers 84' and 84" are provided with circumferential grooves 86 and ridges 88 having substantially the same axial pitch as the helical body and shaft grooves 74 and 80. The circumferential ridges 88 of each of the rollers 84' and 84" are in seated engagement with the corresponding helical body and shaft grooves 74 and 80 (for convenience, the point where the shaft groove bottom engages the roller ridge is shown by a dot, indicated by reference numeral 339 for the two discs 208 comprising the rollers 84'a and 84"a). As the actuator 10 operates, the piston sleeve 50 reciprocates within the body and the two ridges of each of the rollers 84' and 84" roll back and forth in its corresponding helical body and shaft grooves 74 and 80.

The coplanar arrangement for the rollers 84' is shown in FIG. 15 and, as described for the previous embodiments, requires the number of helical shaft grooves 80 be equal to the number of rollers or be an integer multiple thereof, assuming that the rollers are circumferentially distributed with equal inter-roller spacing. For the size of the rollers 84' and helical shaft grooves 80 shown in FIG. 15, this requires that the number of helical shaft grooves be two times the number of rollers utilized. It is noted that if smaller diameter rollers were used, then the number of shaft grooves could be made equal to the number of rollers. Thus, for example, for a situation requiring 16 rollers 84', the shaft must have 16, 32 or 48 grooves, etc. FIG. 15 illustrates a situation using 16 rollers 84' with 32 grooves, and displays four of the rollers 84' in eight grooves of the 32 grooves. It can be seen that the corresponding ridges of adjacent rollers 84' are disposed in every other shaft groove 80. The number of body grooves 74 are determined as previously described for other embodiments.

In comparison, utilizing 16 axially offset rollers 84" requires the shaft to have 24 grooves, rather than 16 or 32 as for rollers 84', or in other words for the same size rollers and grooves, the number of grooves 80 on the shaft may be equal to 1.5 times the number of rollers. This can be accomplished while still maintaining equal inter-roller spacing. In practice, this means that once the number of rollers is selected for the actuator to handle the loads involved, rather than requiring that the helical shaft grooves be equal to the number of rollers used or an integer multiple thereof (assuming equal roller inter-spacing), such as twice the number of rollers used, the number of shaft grooves used can be selected as 1.5 times the number of rollers.

In this embodiment, unlike with the previously described embodiments, the number of body grooves 74 are selected to be equal to the number of shaft grooves 80, in other words, to be equal to 1.5 times the number of rollers. Since the body and shaft grooves 74 and 80 have equal axial pitch and the same number of grooves (i.e., groove starts), and since the grooved inward body surface portion 72 has a larger pitch diameter than the grooved outward shaft surface portion 78, the shaft grooves 80 must have a greater lead angle (i.e., helix angle) than the body grooves 74.

The use of axially offset rollers and a number of grooves 1.5 times the number of rollers, rather than 1 or 2 times the number of rollers as with coplanar rollers, provides added flexibility in designing the actuator. With the actuators presently being designed using the invention, it provides the ability to select, for example, in a 16 roller actuator a design using not only 16 or 32 grooves, but also a design using 24 grooves if axially offset rollers are used. This can be extremely important since it allows more selection in the groove (thread) size for the helical body and shaft grooves 74 and 80, so that a groove size can be selected which is not too fine nor too coarse.

If too many grooves are used, the grooves will be too fine and have a small axial pitch. This means that rollers with correspondingly small axial pitch will be needed, however, the smaller the pitch, the thinner the disks 208 which comprise the rollers 84. With axially thin disks, the rollers have decreased load carrying capability and thus, the overall load rating of the actuator is decreased.

If too few grooves are used, the grooves will be too coarse and have a large axial pitch. Although the individual roller disks will not have to be made thinner, and in fact may even be made thicker, to use rollers of about the same axial length so as not to increase the length of the actuator, the number of disks utilized for each roller will have to be decreased. With fewer roller disks used, there is less load bearing contact between the rollers and the shaft and body, and hence the load carrying capability of the rollers is decreased, as is the overall load rating of the actuator. While rollers may be used having the same number of disks to maintain the same amount of roller/groove load bearing contact, they will have to be made longer to be compatible with the larger axial pitch of the grooves. This will undesirably lengthen the overall size of the actuator. Lengthening of the rollers is, however, also undesirable because the rollers are supported in cantilevered fashion on the spindles and lengthening of the rollers increases the torque applied to the spindles. This can result in spindle failure.

As such, the added flexibility in selecting the number of grooves for the shaft and body is of great assistance in the design of an actuator and allows a design with improved load carrying ability without increasing the roller and actuator length. Another benefit of axially offsetting the rollers and the flexibility provided in selection of the number of grooves used is that the resulting actuator has greater piston travel and displacement, which results in more output torque being produced.

Figure 16:
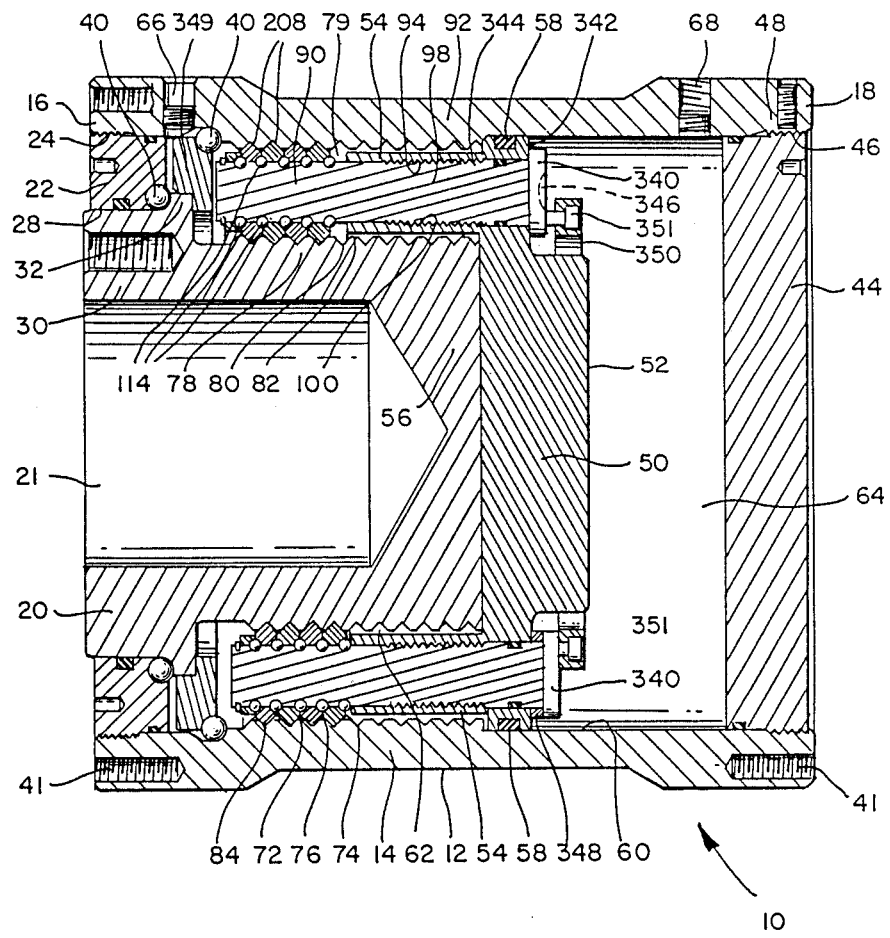
FIG. 16 is another alternative embodiment of the invention utilizing axially offset rollers.

Another alternative embodiment of the invention utilizing the offset rollers is shown in FIG. 16 using rollers 84 with four roller disks 208. A thrust bearing ring 349 is positioned inward of the first end cap 22 and engages the shaft flange portion 32 to restrain the shaft 20 against axial thrust. In this embodiment, the bore holes 94 in the sleeve portion 54 of the piston sleeve 50 into which the spindle support arm portions 92 are received extend fully through the piston head portion 52. In addition, in this embodiment the spindle. Support arm portions 92 each include a head portion 340 which is adjustably movable into engagement with an axially outward end wall 342 of the piston head portion 52 facing toward the second body end 18. The support arm portion 92 has a threaded mid-portion 344 threadably received in the interior threaded end portion 100 of the bore hole 94. A slot 346 is formed in the head 340 of each spindle support arm portion to allow selective turning of the spindle with a tool.

To provide for axial off-setting of adjacent spindles 90, every other one of the spindles has an annular spacing shim 348 with a thickness equal to approximately one-half the pitch of the shaft helical grooves 80. The spindle support arm portion 92 extends through the central aperture of the shim 348, and the shim is disposed between the support arm head portion 340 and the end wall 342 of the piston head portion 52. In this embodiment, the spindle support arm portions 92 are first threadably inserted into the bore holes 94, and then the roller disks 208 and balls 114 that make up each of the rollers 84 are assembled on the spindle 90 which protrudes beyond the sleeve portion 54 of the piston sleeve 50 toward the first body end 16.

Once the spindles 90 with assembled rollers 84 are in place, backlash can be eliminated by unscrewing toward the second body end 18 the circumferentially alternate spindle support arm portions 92 with the shims 348. The support arm portions 92 are unscrewed until sufficient axial movement of every other of the support arm portions (and hence the spindles 90 and the rollers 84 retained thereon), is achieved relative to the other support arm portions (and the spindles and rollers retained thereon) to eliminate the slack between the rollers and the helical body or shaft grooves, as previously described for other embodiments.

The support arm portions without shims are not unscrewed for backlash elimination, and may be seated firmly in the threaded bore holes 94 to lock them in place so that they tend not to work loose The support arm portions with shims, however, have already been at least very slightly loosened for backlash elimination purposes and should be locked in place to prevent their turning and the resulting axial movement thereof during actuator operation. To accomplish this without applying torque to the support arm portions which could cause them to rotate and disturb the backlash elimination setting, a lock ring 350 is bolted to the piston head portion 50 to a side toward the second body end 18 by a plurality of bolts 351. The lock ring 350 engages the head portions 340 of the spindle support arm portions 92 with the shims 348 which have been turned in order to eliminate backlash. This clamps these support arm portions against any further axial movement produced by rotary forces applied to the spindles during fluid powered operation of the actuator and prevents the threaded spindle support arm portions from being backed out of the threaded bore holes 94 within which they are received. Since the head portions of support arm portions 92 with shims are positioned axially outward of the other support arm portions without shims, the lock ring does not engage the head portions of these other support arm portions.

It is noted that while axially offset rollers have been described only for the actuator embodiments of FIGS. 14–16, the same benefits can be realized for the other described embodiments.

Figure 17:
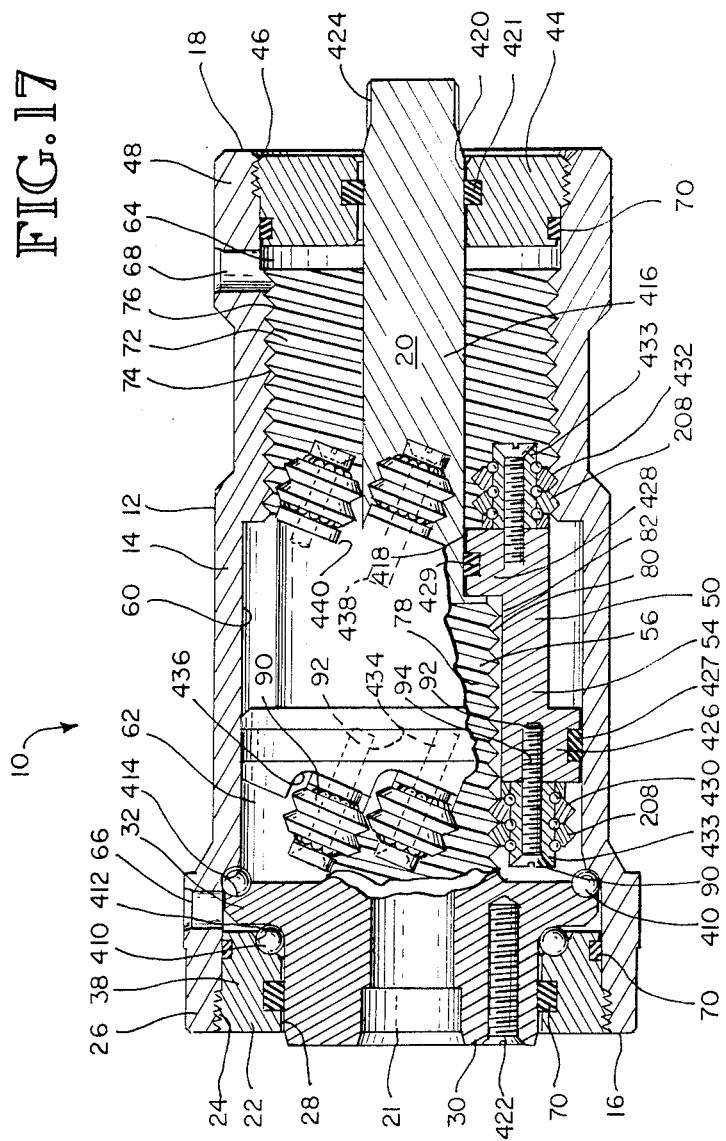
FIG. 17 is a side elevational, sectional view of an alternative embodiment of the invention utilizing axially skewed rollers.

In FIG. 17, an alternative embodiment of the invention is shown using two sets of independent skewed rollers. In this embodiment, the shaft 20 is rotatably held in place against axial thrust by a plurality of thrust bearings 410 disposed within corresponding and confronting circumferential ball races 412 formed in the first end cap 22 and the shaft flange portion 32, and corresponding and confronting circumferential ball races 414 formed in the shaft flange portion 32 and the body sidewall 14. The shaft 20 has a coaxial elongated portion 416 which extends from the shaft end portion 56 (which has cut therein the helical shaft grooves 80) to the second body end 18. The elongated shaft portion 416 projects through a smooth central aperture 418 in the head portion 52 of the piston sleeve 50, and through a smooth central aperture 420 in the second end cap 44. A conventional seal 421 is disposed between the second end cap 44 and the extending shaft portion 416. An external device (not shown) may be attached to either the shaft end portion 30 at the first body end 16 using a plurality of threaded recesses 422 or to a splined shaft extension 424 extending outward beyond the second end cap 44 at the second body end 18.

In the embodiment of figure 17, the inward facing surface portion 72 of the body sidewall 14 having the helical body grooves 74 is positioned toward the second body end 18, and the outward facing surface portion 78 of the shaft end portion 56 having the helical shaft grooves 80 is positioned axially offset therefrom toward the first body end 16. Unlike in prior embodiments, the helical body grooves 74 and the helical shaft grooves 80 are not confronting each other, but rather axially spaced apart. In this embodiment, the piston sleeve 50 has an annular first end head portion 426 positioned toward the first body end 16 and carrying seal 427 disposed between the first end head portion and the smooth wall portion 60 of the body sidewall 14. The piston sleeve 50 further has an annular second end head portion 428 positioned at an opposite end of the piston sleeve and toward the second body end 18. The second end head portion 428 carries a seal 429 disposed between the second end head portion and a smooth exterior surface of the extending shaft portion 416 to define the fluid-tight compartments 62.

The interior smooth wall portion 60 of the body sidewall 14 is positioned toward the first body end 16, and the smooth exterior surface of the extending shaft portion 416 is positioned axially offset from the body interior smooth wall portion 60 and toward the second body end 18. The smooth sidewall portion 60 of the body sidewall 14 and the smooth exterior surface of the extending shaft portion 416 have sufficient axial length to accommodate the full stroke of the piston sleeve 50 within the body 12.

As noted above, the helical body and shaft grooves 74 and 80 are axially spaced-apart. This is because the actuator 10 of FIG. 17 is provided with a first set of rollers 430 positioned at the end of the piston sleeve 50 toward the first body end 16, and a second set of rollers 432 positioned at the end of the piston sleeve toward the second body end 18. The first end rollers 430 are in seated rolling engagement and coact with the helical shaft grooves 80, and are positioned spaced away from and out of engagement with the helical body grooves 74. The second end rollers 432 are in seated rolling engagement and coact with the helical body grooves 74, and are positioned spaced away from and out of engagement with the helical shaft grooves 80. As such and unlike some of the prior embodiments, the first and second end rollers which transmit torque between the body 12, piston sleeve 50 and shaft 20 are out of engagement with each other and not constrained by the design of the other. This allows the first and second end rollers to operate independently of each other.

The first end rollers 430 each have an axial pitch corresponding to the axial pitch of the helical shaft grooves 80 engaged thereby, and the second end rollers 432 each have an axial pitch corresponding to the axial pitch of the helical body grooves 74 engaged thereby. Since separate and independent sets of rollers are used, the helical body and shaft grooves 74 and 80 can be selected with any desired axial pitch independent of the axial pitch of the other, and can be selected with any hand turn, independent of the hand turn of the other. The helical body and shaft grooves 74 and 80 may have the same hand or direction of turn to produce differential rotational movement between the body 12 and the shaft 20, based upon the differential rotation between the piston sleeve and the shaft produced by axial movement of the piston sleeve, or may have the opposite hand to produce compound rotational movement between the body 12 and the shaft 20 to provide a greater output rotation. In addition, the lead angle (i.e., helix angle) selected for the helical body and shaft grooves 74 and 80 can be selected as desired, independent of the lead angle of the other. By using separate and independent sets of rollers, there is no interrelationship between the lead angles, thus allowing great flexibility in the design of the actuator and the range of output characteristics possible.

Of particular significance with the embodiment of FIG. 17, the first and second end rollers 430 and 432 are retained by the piston sleeve 50 in an axially skewed position relative to the longitudinal axis of the coaxially aligned body 12 and shaft 20. The first end rollers 430 are held at a skew angle matching the lead angle of the helical shaft grooves 80, and the second end rollers 432 are held at a skew angle matching the lead angle of the helical body grooves 74. As such, the contact faces of each roller are angularly aligned with the contact faces of the helical grooves with which the rollers are engaged to transmit torque. This avoids the problem produced when rollers are not in full alignment with the grooves they engage.

To help understand the problem involved, it should be remembered that the rollers are, in effect, a plurality of coaxial disks, and each disk rolls in one of the helical grooves and coacts therewith to transmit torque. The greater the angular difference between the plane of the disk and the direction of extension of the helical groove portion within which the disk is rolling, the more the disk tends to roll or bite into the sidewall of the groove as it rolls along, and tends to ride up the sidewall and climb out of the groove, rather than rolling smoothly along the center of the groove. This contact with the groove sidewall produces increased frictional drag and roller scuffing. Moreover, as the disk tends to ride up the sidewall, it pulls away from good engagement with the groove. The result is an undesirable drag force being applied to the rollers and forces which tend to cause the rollers to move out of seated engagement with the grooves in a manner tending to bind the actuator. The rollers tend to scuff along in the grooves since they are not aligned with the grooves for smooth rolling action.

By angularly skewing the first and second end rollers 430 and 432 so they angularly correspond to the lead angle of the respective helical grooves they engage, the problem and the undesirable results described above are almost completely avoided. The rollers roll smoothly along the center of the grooves with little scuffing. In addition, by the ability to select the lead angle, hand and axial pitch for the helical body and shaft grooves 74 and 80 independent of each other, the direction and amount of rotation of the shaft and the output torque on the shaft can be selected from a wide range of possibilities during the design of the actuator. It is noted that while the greatest advantages of skewing are achieved when the rollers are skewed to be angularly oriented in full alignment with the left or right hand grooves they engage, any amount of skewing with an angular orientation corresponding to the hand turn of the engaged groove (i.e., left or right) will improve performance over rollers which are held in coaxial alignment with the actuator.

Another benefit is produced in that by locating the first and second end rollers 430 and 432 at opposite axial ends of the piston sleeve 50 and by axially spacing apart the helical body and shaft grooves 74 and 80 so that they do not significantly overlap, the overall diameter of the actuator body need not be increased beyond the size of prior embodiments shown which utilize a single set of rollers engaging both the body and shaft grooves. This should also be compared with the embodiment of FIG. 12 in which two sets of adjacent rollers are used, one engaging the body grooves and one engaging the shaft grooves, with one set being positioned radially outward of the other. This requires an increased radial distance be provided between the shaft and the body, particularly when it is desired to have both sets of rollers out of engagement with each other. By not locating the two sets of rollers in alternating fashion, as done in FIG. 12 with the rollers of one set between the rollers of the other set, more rollers of each set can be used in the available space. This increases the total surface contact of the rollers and the grooves, and thus the strength and load carrying ability of the actuator.

As with the previously described embodiments, the first and second end rollers 430 and 432 are each rotatably retained in fixed axial and circumferential position relative to the piston sleeve 50 by the cylindrical shaft spindles 90 as the piston sleeve reciprocates within the body 12 during fluid-powered operation of the actuator 10. In the embodiment of FIG. 17, each spindle 90 includes a circumferentially grooved collar 433 on which the disks 208 which comprise the rollers are rotatably retained.

As previously described, each spindle 90 has a coaxially extending and integrally formed support arm portion 92. In the embodiment of FIG. 17, each spindle 90 and its support arm portion 92 are coaxially arranged to form a straight spindle shaft. The support arm portions 92 for the first end rollers 430 are exteriorly threaded and threadably disposed in a plurality of threaded bore holes 434 formed in an axially outward end wall 436 of the first end piston head portion 426 facing toward the first body end 16. The bore holes 434 are evenly circumferentially spaced apart about the piston sleeve 50, and are angularly skewed at an angle to hold the rollers of the spindles disposed therein at the skew angle corresponding to the lead angle of the helical shaft grooves 80. Similarly, the support arm portions 92 for the first end rollers 432 are exteriorly threaded and threadably disposed in a plurality of threaded bore holes 438 formed in an axially outward end wall 440 of the second end piston head portion 428 facing toward the second body end 18. The bore holes 438 are evenly circumferentially spaced apart about the piston sleeve 50, and are angularly skewed at an angle to hold the rollers of the spindles disposed therein at the skew angle corresponding to the lead angle of the helical body grooves 74.

The spindles 90 hold the first and second end rollers 430 and 432 restrained against axial movement relative to the spindles for rotation about the spindles. With these rollers, however, the rotational axes are skewed relative to the longitudinal axis of the coaxial body 12 and shaft 20. Because of the angular skewing of the rollers 430 and 432, the longitudinal axes of rotation of the rollers extend somewhat crosswise to the body 12 and the shaft 20. As such, the rollers must have limited length otherwise the outside rollers of the rollers 430 would not be in full engagement with the helical shaft grooves 80, and the middle rollers of the rollers 432 would not be in full engagement with the helical body grooves 74. This is a result of the curvature of the shaft and body, and assumes that each disk 208 of the rollers has the same diameter. In the presently preferred embodiment shown in FIG. 17, the rollers 430 and 432 each have only two coaxially mounted disks 208 and both have the same diameter. As a result, each will always be in full engagement with the grooves they engage.

Figure 19:
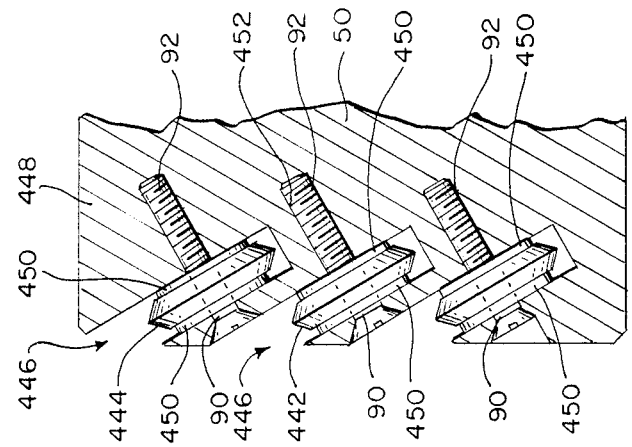
FIG. 19 is a fragmentary side elevational view showing the piston sleeve of the actuator of FIG. 18 with the rollers disposed in slots.
Figure 18:
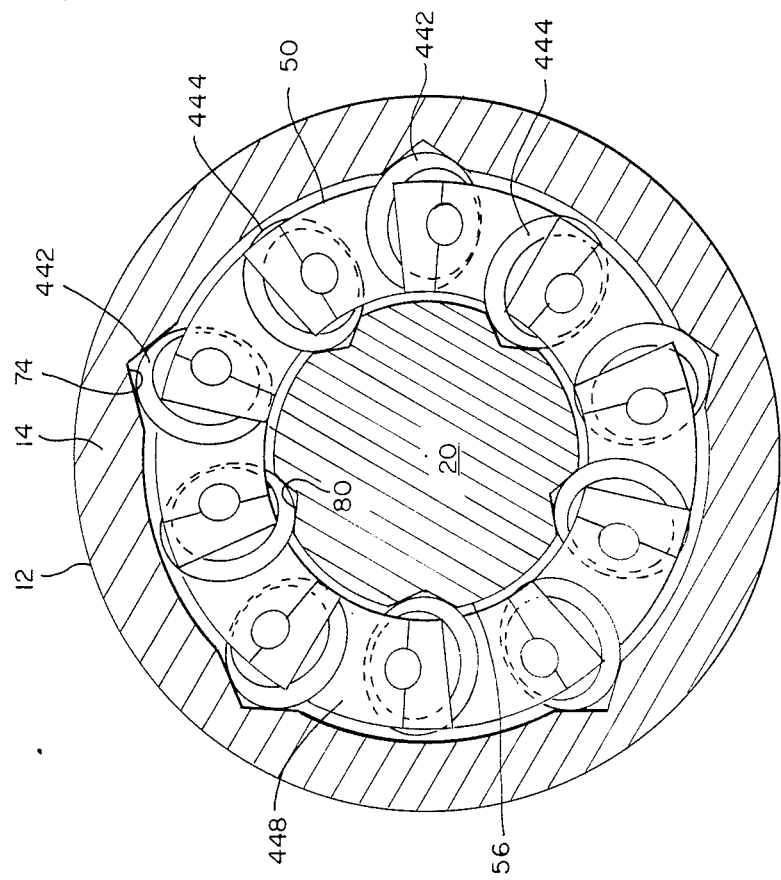
FIG. 18 is an end, sectional view of another alternative embodiment of the invention utilizing single disk axially skewed and radially offset rollers.

Another embodiment of the invention using skewed rollers is shown in FIGS. 18 and 19. While not shown in the drawings, the actuator of this embodiment utilizes a body 12 and shaft 20 arrangement similar to the actuator of FIG. 14. The helical body grooves 74 and the helical shaft grooves 80 are confronting each other, and much like in the embodiment of FIG. 12, every other one of the rollers is a body engaging roller 442 positioned radially outward to engage the helical body grooves 74. The rollers therebetween are shaft engaging rollers 444 positioned radially inward to engage the helical shaft grooves 80. The rollers 442 are out of engagement with the helical shaft grooves, and the rollers 444 are out of engagement with the helical body grooves, similar to the arrangement in FIG. 17. As such, the flexibility of design described above is provided in that the lead angle, hand and pitch for the helical body and shaft grooves can be independently selected.

Similar to the embodiment of FIG. 17, the rollers 442 and 444 of this embodiment are retained in an axially skewed position relative to the body 12 and shaft 20 by a skew angle corresponding to the lead angle of the particular grooves the rollers engage. The rollers 442 and 444 each comprise a single roller disk positioned within an angled slot 446 formed in an annular end wall portion 448 of the piston sleeve 50 toward the first body end 16. Each slot 446 is inwardly and outwardly opening so the roller therein can be positioned to project radially inward or outward beyond the piston sleeve to engage either the body or shaft grooves 74 or 80. A pair of bushing 450 are also positioned within the slot 446, one to each side of the roller 444 The spindle 90 and the support arm portion 92 are coaxial and formed as an integral straight spindle shaft, and are disposed in an angularly skewed bore hole 452 formed in the piston sleeve 50 and extending to both sides of the slot 446. This provides support for the rollers on both sides. The bore hole 452, and hence the spindle 90 are radially offset outwardly for the body engaging rollers 442 to position them in rolling engagement with the helical body grooves 74, and are radially offset inwardly for the shaft engaging rollers 444 to position them in rolling engagement with the helical shaft grooves 80.

Figure 22:
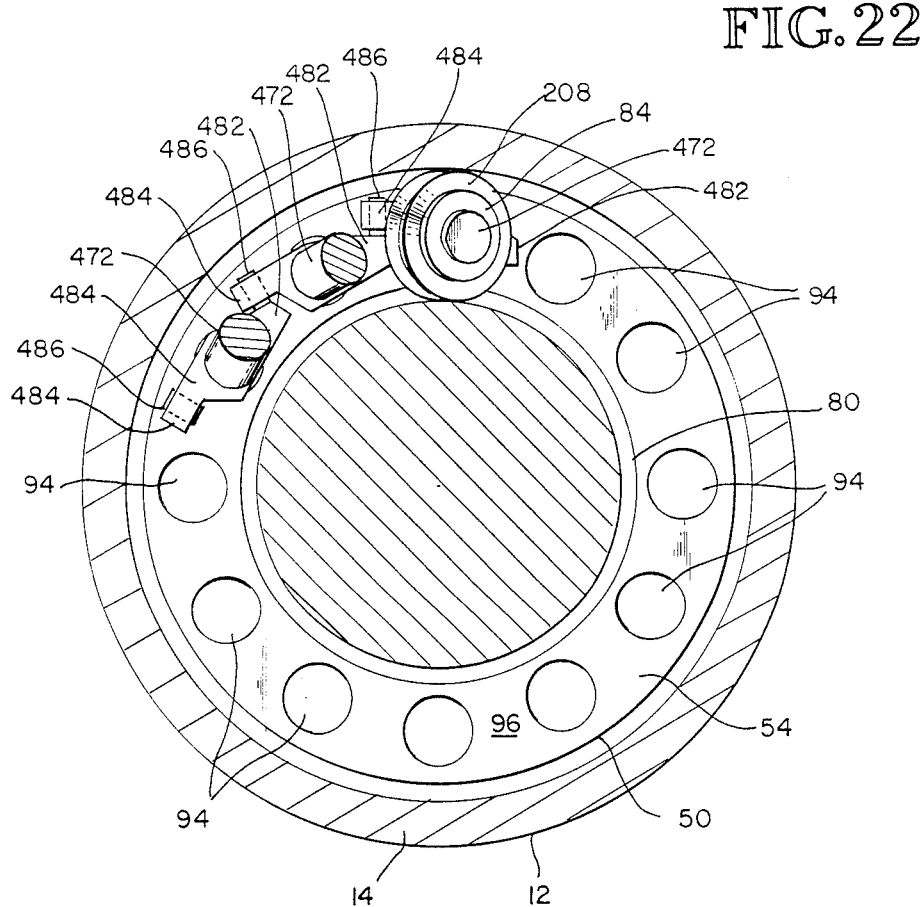
FIG. 22 is an enlarged end, sectional view taken substantially along the line 22—22 of FIG. 20 showing three cantilevered axially skewed spindles disposed in their retaining bore holes, with one spindle having a roller retained thereon.

Yet another embodiment of the invention similar to that of FIG. 17 is shown in FIGS. 20, 21 and 22. In this embodiment, the body sidewall 14 is formed in first and second body halves 454 and 456, respectively, which each have a threaded inward end portion 458 threadably connected to the inward end portion of the other body half. Rather than using end caps, the body 12 has first and second end annular body flange portions 460 and 462 projecting radially inward from the body sidewall 14 at the first and second body ends 16 and 18, respectively. The shaft 20 is held in place against axial thrust by the first and second end ball races 412 and 414, respectively, and the balls 410 disposed therein. The first end ball races 412 are formed in the first end body flange portion 460 and a corresponding portion of the shaft 20 toward the first body end 16. The second end ball races 414 are formed in the second end body flange portion 462 and a corresponding portion of the shaft 20 at the second body end 18. Conventional seals 463 are disposed between the first and second body end flange portions 460 and 462 and the shaft 20 to prevent fluid leakage.

In this embodiment, a single annular piston head portion 464 is utilized and carries an inner seal 466 to provide a fluid-tight seal between the piston head portion and the smooth wall shaft portion 416 of the shaft 20. As with the previously described embodiment of FIG. 14, the piston sleeve 50 does not carry an outer seal, but rather a seal 468 is positioned stationary within a groove 470 in the first body halve 454 toward the mid-portion of the body sidewall 14. The piston sleeve 50 has a smooth outer wall portion 471 which is sealably engaged by the seal 468 and slides past the seal as the piston sleeve reciprocates within the body 12. The smooth outer wall portion 471 has sufficient axial length to accommodate the full stroke of the piston sleeve 50. By not requiring the piston sleeve to carry both inner and outer seals in order to form the fluid-tight chambers 62 and 64, the overall length of the actuator 10 is shortened and placement of the port 66 is made easier, as will be described in more detail for another embodiment. Also, the use of the split housing using body halves 454 and 456 is made possible where the first body half can be manufactured from a less expensive casting since the first body half has no grooves or expensive interior finishing, and only serves as a simple pressure vessel. Although less expensive, it has been found undesirable to use a casting where a smooth wall interior surface must be machined for engagement by a sliding seal. This is because of the voids found in even the better castings which when exposed by the machining causes the interior surface to be somewhat abrasive, and results in undesirable seal wear.

As best shown in FIG. 21, and unlike with the spindles of FIGS. 17 and 18, to provide for axial skewing this embodiment utilizes a spindle 472 which is axially eccentric with respect to a support arm portion 474 integrally formed therewith. The spindle 472 is at an angle relative to the support arm portion 447, indicated by a double headed arrow 475, which corresponds to the lead angle of the helical shaft grooves 80 with which the roller 84 retained on the spindle is engaged. In this embodiment, only the rollers 84 at the first body end 16 are angularly skewed and the rollers at the second body end 18 for engaging the helical body grooves 74 are oriented in parallel axial alignment with the body 12.

With this angled arrangement of the spindle 472 and the support arm portion 474, the angular skewing of the rollers 84 may be accomplished while still utilizing bore holes 94 in the piston sleeve 50 formed in parallel axial alignment with the piston sleeve and the body. The bore holes 94 extend from the end wall 96 of the piston sleeve 50 fully through to an end wall 478 of the piston head portion 464 toward the second body end 18. This avoids the need for forming of axially skewed bore holes in the relatively thin walled piston sleeve.

As best shown in FIG. 20, the spindle support arm portions 474 for the rollers 84 at the first body end 16 each carry an O-ring seal 479 positioned in a groove in the support arm portion. The seal 479 prevents fluid leakage between the compartments 62 and 64. These same support arm portions 474 are each further provided with a coaxially extending, integrally formed threaded extension 480.

Each of the rollers 84 at the second body end 18 each have a threaded recess 481. The recess 481 threadably receives one of the support arm portion threaded extensions 480 and locks together the two support arm portions 474 and 92 of a corresponding pair of the spindles 472 and 90 positioned at opposite ends of the piston sleeve 50 with their support arm portions in a single one of the bore holes 94. For reasons which will be described below, the support arm portions 474 are rotatably disposed in the bore holes 94 for at least rotation within a limited range even after the support arm portions of corresponding pairs of spindles are locked together.

As with previously discussed embodiments, this arrangement uses separate and spaced apart sets of rollers to engage the helical body and shaft grooves 74 and 80 to provide the flexibility of independently operating rollers, and body and shaft grooves which may be designed to have any desired lead angle, hand or axial pitch. While shown with opposing spindles threadably connected together, alternative designs for rotatably maintaining the corresponding pairs of the spindles 472 and 92 in place within its bore holes 94 may be utilized.

An additional benefit provided with this embodiment of the invention is adjustability to eliminate backlash between the rollers 84 of the spindles 472 and the helical shaft grooves 80 they engage. As best shown in FIGS. 21 and 22, each of the spindles 472 is provided with an engagement arm 482 projecting outward from one side of the spindle, and an adjustment arm 484 projecting outward from an opposite side of the spindle. The adjustment arm 484 is provided with a set screw 486 which is threadably received in a transverse threaded aperture 488 extending fully through the adjustment arm 484. The set screw 486 is selectively rotatable to project from the adjustment arm 484 and engage the engagement arm 482.

Three of the spindles 472 are shown in FIG. 22 to illustrate the backlash elimination adjustment, with the three spindles being positioned in their corresponding bore holes 94 and with the roller 84 for two of the spindles shown removed. The engagement arm 482 and the adjustment arm 484 project outward from the spindle 472 in a plane generally defined by the support arm portion 474 and the angled spindle 472. As shown in FIG. 22, the engagement arm 482 and the adjustment arm 484 are positioned within the space between the shaft 20 and the body sidewall 14, and are tangently oriented relative to the shaft but spaced outwardly therefrom.

As shown in FIG. 22 (viewed from the first body end 16), circumferentially adjacent ones of the spindles 472 are positioned with the adjustment arm 484 of one spindle positioned adjacent to and radially outward of the engagement arm 482 of the next adjacent spindle. This produces a clockwise rotational torque on the adjacent spindle when the set screw 486 is adjustably extended to engage and press upon the engagement arm. As stated above, the support arm portions 474 are rotatably disposed within the bore holes 94 for at least limited rotation so as to permit adjustable rotational movement of the spindles 472 for backlash elimination purposes.

Because of the eccentricity between the support arm portion 474 and the spindle 472, which is indicated in FIG. 21 by the arrows 489, clockwise rotation of the spindle resulting from adjustable extension of the set screw 486 swings the roller retained on the spindle into increased rolling engagement with the corresponding helical shaft grooves.

By sequentially adjusting each of the spindles 472 in the set of spindles at the first body end 16, the engagement force of the rollers 84 retained thereby with the corresponding shaft grooves 80 can be selected. Because of the spindle eccentricity, not only does the adjustment affect the engagement of the roller with the grooves, the eccentric adjustable movement of the roller also produces axially inward movement of the roller relative to the groove with which it is engaged. This produces axially outward movement (toward the first body end 16) of the rollers 84 relative to the shaft 20. The axially outward movement created by adjustable rotation of the rollers 84 on the spindles 472, when accomplished after the piston sleeve 50 is assembled on the shaft 20 and the rollers 84 on the spindles 92 are positioned in engagement with the helical body grooves 74, before the first body half 454 is attached to the second body half 456, eliminates any slack which may exist between the rollers and the helical body and shaft grooves 74 and 80 they engage. Hence, the adjustment substantially eliminates all backlash and axially preloads the rollers. Once adjusted to eliminate the slack and set the preloading, the set screws 486 hold the spindles 472 locked in their position during actuator use.

It is noted that not only does the extension of the set screw 486 for any single spindle 472 tend to rotate the next adjacent spindle engaged clockwise as a result of the force being applied to the engagement arm 482 on the adjacent spindle, the reactionary force applied on the set screw also tends to rotate clockwise the spindle with the set screw being adjusted. Of course, when the spindle being adjusted is rotated clockwise, its engagement arm is moved, which affects the force being applied thereto by the set screw of the adjacent spindle on the other side. Because the spindles 472 are all rotatably disposed within their bore holes 94, the force applied by one set screw tends to impact each of the other spindles in a set. By gradual and even adjustment of the set screws for each of the spindles comprising the set, equal engagement forces can be obtained between the roller supported thereby and the corresponding helical shaft grooves 80, and equal axial movement can be achieved of the rollers for backlash elimination purposes.

In the embodiment of FIG. 20, the problems of bending and possible failure under large loads inherent with cantilevered spindles is reduced for the straight spindles 92 at the second body end 18 by the use of an annular spindle support plate 483. The plate 483 has holes 485 circumferentially spaced apart around the plate and sized to receive the free end portions of each of the spindles, as shown in FIG. 20A with the plate removed from the actuator 10.

The plate 483 is positioned on the free end portions of the spindles 92, axially outward of the outermost roller disk 258 comprising each of the rollers 84 and inward of the split rings 230 on the spindles. As with the individual retainer rings 226 used in the embodiment of FIG. 13, the side of the plate 483 toward the disks 208 has an axially inward opening ball groove 487 formed concentric with each of the plate holes 485 and corresponding to the ball groove 216 of the outermost roller disk 208. The ball groove 487 and the ball groove 216 of the roller disk form a complete roller ball race. The plate 483 ties the free end portions of the spindles 92 together and thereby provides them with lateral support and improves their ability to withstand bending and failure under loading.

Yet another embodiment of the invention is shown in FIGS. 23 and 24. In this embodiment, the actuator 10 is illustrated with the orientation of its first and second body ends 16 and 18 reversed compared to the previously described actuators. The actuator has a body and shaft design very similar to the embodiment of FIG. 14, and as with that embodiment the piston head portion does not carry an outer seal, but rather the seal 336 is positioned stationary within the groove 337 in the body sidewall 14. Unlike with the embodiment of FIG. 14, the piston sleeve 50 does not even carry an inner seal and has no distinct piston head portion. Rather, the piston sleeve 50 has a smooth outward wall surface 490 and a smooth inward wall surface 492. The outward wall surface 490 is sealably engaged by the seal 336 to prevent fluid leakage between the compartments 62 and 64, and has sufficient axial length to accommodate the full end-to-end axial stroke of the piston sleeve 50. Similarly, the inward wall surface 492 of the piston sleeve 55 is sealably engaged by a seal 494 positioned stationary within a groove 496 in the shaft 20. The inward wall surface 492 has sufficient axial length to accommodate the full end-to-end axial stroke of the piston sleeve 50. With this arrangement, it is not necessary for the piston sleeve 50 to carry any seals, allowing greater flexibility with respect to positioning of the helical body and shaft grooves 74 and 80 on the body sidewall 14 and the shaft 20.

In this embodiment, the helical body and shaft grooves 74 and 80 are axially spaced apart, but yet are slightly overlapped toward the middle portion of the actuator. As best illustrated in FIG. 23, the piston sleeve 50 is provided with a radially outwardly opening, circumferentially extending first end recess 500 within which a first end set of rollers 502 are positioned for engaging the helical body grooves 74. The piston sleeve also is provided with a radially inwardly opening, circumferentially extending second end recess 504 within which a second end set of rollers 506 are positioned for engaging the helical shaft grooves 80. As with the embodiments just discussed, each of the first and second end rollers 502 and 506 are engaged either with the helical body grooves 74 or the helical shaft grooves 80, but not both.

To accomplish this, the first end rollers 502 are positioned within the first end recess 500 radially outward relative to the second end rollers 506. The first end recess 500 has an inward sidewall portion 508 positioned between the first end rollers 502 and the shaft 20. The inward side of the sidewall portion 508 forms a part of the smooth inward wall surface 492 of the piston sleeve 50. The second end rollers 506 are positioned within the second end recess 504 radially inward relative to the first end rollers 502. The second end recess 504 has an outward sidewall portion 510 positioned between the second end rollers 506 and the body sidewall 14. The outward side of the sidewall 510 forms a part of the smooth outward wall surface 490 of the piston sleeve 50.

With this embodiment, the first and second end rollers 502 and 506 are positioned axially inward of the ends of the piston sleeve 50, rather than projecting beyond the piston sleeve ends and using cantilevered spindles as in the embodiment of FIG. 20. By use of this arrangement and the use of stationary seals 336 and 494, rather than seals which travel with the reciprocating piston sleeve 50, a shorter actuator body design is possible and location of the ports 66 and 68 is made easier. As illustrated in the embodiment of FIG. 1 using a conventional piston head 52, it becomes difficult on finding an adequate location for the port 68 which will not interfere with the seal used between the piston sleeve 50 and the body sidewall 14, thus forcing location of the port 68 to the second end cap 44 or requiring elongation of the body sidewall to provide a location for the port therein which will not interfere with the seal 58 as the piston sleeve reciprocates. In the embodiment of FIG. 23, these problems are alleviated because the ports 66 and 68 can be located without concern for the interfering with seals as the piston sleeve 50 reciprocates and without elongating the body sidewall to locate the ports axially outward of the piston head portion carrying the seals since the piston sleeve carries no seals. Moreover, since the piston sleeve 50 no longer requires a piston head portion with a sufficient axial length to each side of the seal to retain the seal, the overall axial length of the piston sleeve is reduced and a shorter actuator can be built.

Unlike many of the previously described embodiments utilizing a cantilevered spindle, the first and second end rollers 502 and 506 are each rotatably retained on a spindle 512 which is supported at both ends by a pair of support arms 514. The two support arms 514 for each spindle 512 are cylindrical shafts coaxially arranged with respect to each other, and hold the spindle eccentrically positioned therebetween at a skew angle corresponding to the lead angle of the grooves with which the roller rotatably retained on the spindle is to rollingly engage. Each of the spindles 512 is provided with a connector arm 516 which extends laterally from an end portion 523 of the spindle which is offset from its corresponding support arm 514 to provide end support for the spindle and accomplish the angular skewing. The support arms 514 and connector arm 516 are formed integrally with the spindle 512 they support. By supporting each of the spindles 512 at both ends by the pair of support arms 514, each held within a bore hole as will be described below, the load carrying ability of each spindle is significantly increased over that of a cantilevered spindle. Moreover, the potential overloading problem with cantilevered spindles which might cause them to bend and reduce groove engagement or possibly even fail under excessive loading is avoided.

The first end recess 500 is defined by a circumferentially extending first end wall 518 of the piston sleeve 50 positioned toward the first body end 16 and axially spaced apart from a circumferentially extending midsection wall 520 of the piston sleeve positioned toward the mid-portion of the piston sleeve. Similarly, the second end recess 504 is defined by a circumferentially extending second end wall 522 of the piston sleeve 50 positioned toward the second body end 18 which is axially spaced apart from the mid-section wall 520. The two support arms 514 for each of the spindles 512 are rotatably disposed in a pair of bore holes 524 formed in the first end wall 518 and the mid-section wall 500 for the spindles in the first end recess 500, and formed in the second end wall 522 and the mid-section wall 520 for the spindles in the second end recess 504.

The bore holes 524 for each spindle 512 are axially aligned with each other and in parallel axial alignment with the body 12 and shaft 20. The bore holes 524 are evenly circumferentially spaced apart about the piston sleeve 50 to provide substantially equal inter-roller spacing between the rollers rolatably retained on the spindles 512 supported by the support arms 514. To facilitate insertion and removal of the support arms 514 in the bore holes 524 in the first and second end walls 518 and 522, each bore hole in the end walls has a radially outward or inward opening sidewall portion 525 through which the support arm disposed in the bore hole can be laterally moved. The open sidewall portion 525 in the bore holes 524 in the first end wall 518 opens outward and the second end wall 522 opens inward.

Associated with each of the spindles 512 is a threaded adjustment set screw 526 positioned in a threaded bore hole 528 located in the first end wall 518 for the first end rollers 502, and located in the second end wall 522 for the second end rollers 556. The set screw 526 is adjustable to project inward into the corresponding first or second end recess 500 or 504, and engage a sloped surface portion 530 formed at the offset end portion 523 of each spindle 512 and adjacent to the spindle connector arm 516.

The sloped surface portion 530 is angled relative to the set screw 526 so that when engaged by the set screw and the set screw is turned to advance further into the corresponding recess a force will be applied to the spindle to rotate the spindle and its support arms 514 as a unit relative to the piston sleeve 50. When so rotated, the spindle 512 rotates in an eccentric manner relative to the axis of the support arms 514 for the spindle. This eccentric rotation moves the roller rotatably retained on the spindle into increased engagement with the corresponding helical body or shaft grooves 74 or 80. As previously described for the actuator of FIGS. 20–22, the eccentric rotation of the spindles 512 and the rollers retain thereon not only brings the rollers into increased engagement with the corresponding grooves, but also produces axial movement of the rollers relative to the body and shaft for backlash elimination purposes.

Since inward adjustment of the set screw 526 tends to rotate the spindle 512 outward for those in the first end recess 500 and inward for those in the second end recess 504, the force applied on those spindles is in the opposite radial direction to press the support arms against the closed sidewall of the bore holes 524 and thereby the spindles are held firmly in place in the bore holes during usage of the actuator.

As best shown in FIG. 24, every other one of the circumferentially distributed second end rollers 502 is axially off-set from the next adjacent rollers by approximately one-half of the axial pitch of the helical shaft grooves 80 which the rollers engage. As previously described for the embodiments of FIGS. 14–16, by axially off-setting the rollers and still maintaining a balanced arrangement with equal inter-roller spacing, the second end rollers 502 may be placed closer together. Moreover, rather than requiring the number of helical shaft grooves 80 to be equal to the number of the second end rollers 502 or be an integer multiple thereof, the actuator can be designed with the number of shaft grooves being equal to an integer number plus 0.5 times the number of second end rollers utilized. As previously noted, this provides extra flexibility in the design of the actuator. If desired, both sets of rollers may be axially offset.

In practice, this means that once the number of rollers is selected for the actuator to handle the loads involved, rather than requiring that the helical grooves be equal to the number of rollers used or an integer multiple thereof (assuming equal roller inter-spacing), such as twice the number of rollers used, the number of shaft grooves used can be selected as 1.5, 2.5, 3.5, etc., times the number of rollers. With the use of offset rollers, as well as the other improvements previously discussed, an actuator designer is permitted more selection or flexibility in the detailed design of the actuator in order to produce a wide range of possible actuator output characteristics not previously practical to achieve.

The alternating axial off-setting of the second end rollers 502 is accomplished in the present embodiment by utilizing an annular spacer bearing 532 positioned between the spindle 512 and the mid-portion wall 520, with the support arm portion 514 projecting therethrough. Such a spacer bearing is utilized on every other one of the spindles 512 in the second end recess 504. It is noted that the spindles 512 for the first end rollers 506 in the first end recess 500 are not axially off-set and have a coplanar arrangement. This requires the number of helical body grooves 74 be equal to the number of rollers or be an integer multiple thereof, assuming that the rollers are circumferentially distributed with equal inter-roller spacing. Of course, with either the first or second end rollers 502 or 506, if desired, one or more of the spaces provided for a roller may be left unoccupied if it is desired to use fewer rollers. The axial off-setting of the second end rollers 506, and the coplanar arrangement of the first end rollers 502 can be conveniently seen using the reference lines marked with the letters "A" and "B", respectively, in FIG. 24.

In the embodiment of FIGS. 23 and 24, the actuator 10 has 8 first end rollers 502 and 8 second end rollers 506, with all rollers being held at a skew angle of 25 degrees. The shaft 20 has 12 helical shaft grooves 80 (i.e., 1.5 X the number of rollers for engagement therewith), and the body sidewall 14 has 24 helical body grooves 74 (i.e., 3 X the number of rollers for engagement therewith). The helical shaft grooves 80 are right hand and have a helix angle of about 28 degrees, and the helical body grooves 74 are right hand and have a lead angle of about 25.8 degrees. Since the turn or hand of the grooves for the body and shaft are both right hand, differential rotational movement is produced. The resulting rotation movement between the piston sleeve 50 and the body 12, and between the piston sleeve and the shaft 20 are in opposite directions and hence the difference between them determines the overall rotational output of the shaft relative to the body.

As shown in FIG. 24 for roller of the second end rollers 506, the skew angle of the spindle 512 is indicated by a double headed arrow 534, and the eccentricity of the spindle relative to the support arms 514 is shown by the arrows 536.

A final embodiment of the invention is shown in FIGS. 25, 26 and 27. In this embodiment, the piston head portion 52 is of conventional design. The elongated portion 312 of the shaft 20 projects through the central aperture 314 in the head portion 52, and has a threaded outer portion 550 threadably received within a threaded portion 552 of a second end retainer nut 554. The retainer nut 554 is rotatably received within a central aperture 556 of the second end cap 44 and has a radially outward extending flange portion 558 positioned outward of the second end cap 44. A thrust bearing 560 is disposed between the nut flange portion 558 and the second end cap 44 to hold the shaft 20 in place against axial thrust. The shaft end portion 56 which has cut therein the helical shaft grooves 80 has a threaded outer portion 562 threadably received within a threaded portion 564 of a first end cap 566 positioned at the first body end 16. The first end cap 566 is fixedly attached to the shaft 20 but is free to rotate relative to the body 12. The first end cap 566, and hence the shaft 20, are held in place against axial thrust by thrust bearings 568 disposed between a circumferential ball race 570 formed in the body sidewall 14 and a confronting circumferential ball race 572 formed in the first end cap. A plurality of fastening clips 574 are provided to clamp the body 12 to a valve or other device (not shown) which the actuator operates As with the several embodiments of the invention just described, the actuator of FIGS. 25–27 utilizes a plurality of skewed rollers 575, each rotatably retained on an axially skewed spindle 576. The individual spindles 576 are skewed at an angle to place the rollers 575 retained thereon in alignment with whichever of the helical body or shaft grooves 74 or 80 they engage. In this embodiment, the rollers 575 are each disposed in a circular window 578 formed in the sleeve portion 54 of the piston sleeve 50. As will be described in more detail below, a first plurality of the rollers 575 (indicated by addition of the reference letter "a") are positioned radially outward to engage the helical body grooves 74, and hence are axially skewed to correspond to the lead angle of the body grooves. A second plurality of the rollers 575 (indicated by addition of the reference letter "b") are positioned radially inward to engage the helical shaft grooves 80, and hence are skewed to correspond to the lead angle of the shaft grooves.

Each of the spindles 576 includes a pair of support arms 580 coaxially arranged with respect to each other and the spindle, and projecting in opposite directions from the ends of the spindle. The support arms 580 are formed integrally with the spindle they support. The windows 578 are each sized to receive one of the spindle 576 therein with the support arms 580 for the spindle positioned in lateral engagement with the sleeve portion 54. In the case of the rollers 575-a which are positioned radially outward to engage the helical body grooves 74, a recess 581 is formed about each of the windows 578 on the outward side of the sleeve portion 54 to receive the support arms 580 and radially position the rollers supported thereby for rolling engagement with the helical body grooves.

For the rollers 575-b which are positioned radially inward to engage the helical shaft grooves 80, the roller and its spindle 576 are assembled by positioning in the window 578 from the inward side of the sleeve portion 54. The thicknesses of the sleeve portion 54 and the support arms 580 are sized to position the rollers in rolling engagement with the helical shaft grooves 80.

As noted before, the rollers 575-a in engagement with the helical body grooves 74 are held out of engagement with the helical shaft grooves 80, and hence can be skewed at an angle to match the body grooves. Similarly, the rollers 575-b in engagement with the helical shaft grooves 80 are held out of engagement with the helical body grooves 74, and hence can be skewed at an angle to match the shaft grooves.

The rollers 575 are each held fixed within the windows 578 at the selected skewed angle by a pair of fasteners 582, such as screws, which each project through one of the support arms 580 and is threadably received in the sleeve portion 54. While the fasteners 582 are used to maintain the spindle angular orientation, when the actuator is operated, the reactionary forces produced on the rollers 575-a which engage the helical body grooves 74 tend to press their support arms 580 inward into firm engagement with the sleeve portion 54. Similarly, the reactionary forces on the rollers 575-b which engage the helical shaft grooves 80 tend to press their support arms outward into firm engagement with the sleeve portion 54.

An additional advantage with this embodiment is that the same spindle and roller unit can be utilized for many actuators having different lead angles, hand and numbers of rollers. In addition, the same piston sleeve 50 with windows 578 can be used for all actuator designs. All that need be changed or machined specially for an actuator to provide any particular output requirements is the lead angle and hand turn of the helical body and shaft grooves 74 and 80, and the angle at which the roller/spindle units are fixed within the windows. It is anticipated that a sufficient variety of outputs can be achieved, in terms of shaft rotation and output torque, by utilizing a uniformly grooved body and a standard piston sleeve 50. Only the helical shaft grooves 80 need be specially machined to produce the required actuator output and the rollers 575-b for engagement therewith set at a skew angle matching the lead angle for the grooves. The rollers 575-b are easily set at any desired skew angle simply by drilling and tapping the holes to receive the fasteners 582 at the required annular orientation for the spindles 576.

Examples of two arrangements for an actuator using the basic body and piston sleeve design of FIG. 25 are shown in FIGS. 26 and 27. The two arrangements produce substantially different output characteristics by only varying the lead angle of the helical shaft grooves 80 and the screw angle of the rollers 575-b to match. In particular, in the arrangement of FIG. 26, the spindle 576 which rotatably retains the rollers 575-a for engagement with the helical body grooves 74 are set at a skewed angle of 25 degrees for engagement with right hand helical body grooves having about the same lead angle. The two next adjacent spindles which rotatably retain the rollers 575-b for engagement with the helical shaft grooves 80 are set at a skew angle of about 68 degrees for engagement with right hand helical shaft grooves having about the same lead angle. For the particular leads selected, the calculated shaft rotation per inch stroke of the piston sleeve 50 is 36 degrees, and the output torque is 2,600 inch-pounds using 80 psi fluid pressure. For a 2.5 inch stroke piston, this produces a total shaft rotation of 90 degrees in response to the piston sleeve moving axially from end-to-end within the body 12.

In comparison, by simply replacing the shaft 20 with one having the lead angle of the helical shaft grooves 80 changed to about 66.8 degrees left hand and setting the rollers 575-b to a skew angle to correspond, as shown in FIG. 27, the output characteristics of the actuator change significantly. The angular orientation of the rollers 575-a, the lead angle of the helical body grooves and all other aspects of the actuator remain the same. In particular, the calculated shaft rotation per inch stroke of the piston sleeve 50 is 72 degrees, and the output torque is 1,300 inch-pounds. For a 2.5 inch stroke piston, this produces a total shaft rotation of 180 degrees.

While further examples are not shown, by varying the lead angle of the helical shaft grooves 80 and the angular orientation of the rollers 575-b to match, the rotational output of the actuator shaft can be selected as desired. With the actuator 10 of FIG. 25, the rotational output can be easily set from 90 to 360 degrees, with the torque output varying from 2,600 to 650 inch-pounds. This flexibility of design, with only requiring the replacement of a shaft with grooves having a desired lead angle and setting of the angular orientation of the rollers 575-b to correspond, has been found particularly useful with valve actuators. An inventory of standard components can be maintained with the only machining necessary to suit any particular need being the cutting of the helical shaft grooves 80 and the drilling of the holes for the roller fasteners 582. All other parts can be used for all actuator designs without modification or additional fabrication, including the roller/spindle units no matter what skew angle is desired. The advantages are clear in terms of reduced inventory, speed of delivery of an actuator suiting a particular need, and the versatility of designing and manufacturing actuators having any desired output characteristics. In addition, all of the advantages of using independent and separate sets of skewed rollers are provided. It is noted that as with the embodiment of FIGS. 23 and 24, this embodiment provides support for the spindles 576 at both ends and is not subject to bending and possible failure under heavy loads which can be realized with cantilevered spindles.

It is noted that while many of the embodiments described and shown utilize two independent sets of axially spaced apart skewed rollers, it may be desirable to utilize a single set of axially skewed rollers with either a second set of axially aligned rollers (such as in FIG. 20) or other torque-transmitting means. In particular, the rollers for engaging the helical body grooves 74 would most likely be axially aligned (or in other words straight rather than skewed) since these rollers generally experience less strain than the rollers engaging the helical shaft grooves 80 during operation of the actuator.

Figure 28:
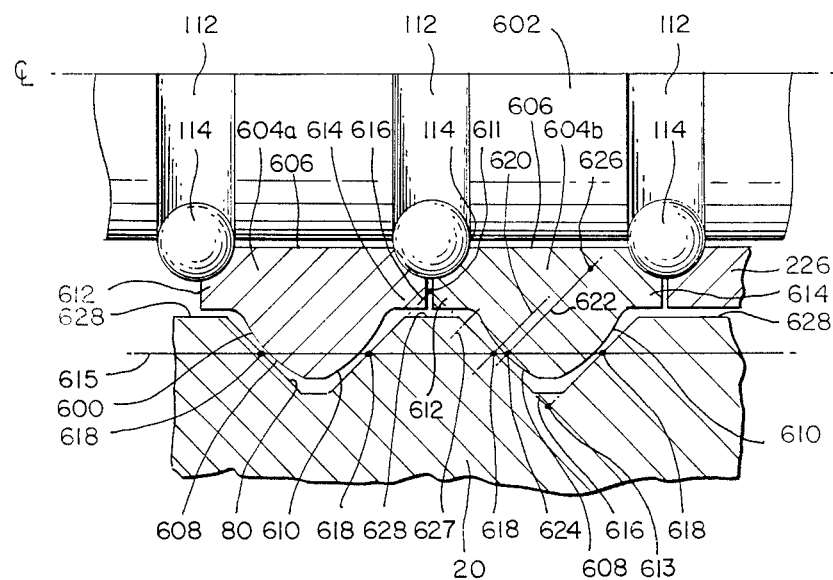
FIG. 28 is a fragmentary, partial side elevational, sectional view of an alternative embodiment of the rollers.

In FIG. 28, an alternative embodiment of a roller 600 is shown which is usable with any of the actuators described using spindles. The roller 600 is shown mounted on a spindle 602 engaged with the helical shaft grooves 80 of the shaft 20. The roller 600 is somewhat similar in basic construction to the rollers 84 shown in FIGS. 9 and 10 in that the roller includes a pair of annular roller disks 604, indicated by the reference letters a and b, disposed on the spindle 602 in axially adjacent positions and operating together to form the roller. Each of the roller disks 604 has a coaxial opening 606 therethrough sized to slide axially onto the spindle 602 during assembly and for free rotation about the spindle during powered operation. However, the roller disks 604 of this embodiment also have several important differences which provide improved performance.

With the roller embodiment of FIGS. 9 and 10, the construction produces a roller with a limited pitch (i.e., the axial distance between adjacent roller ridges, or in other words roller disk peaks). Also, this construction produces roller disks which do not work as well as desired with helical body or shaft grooves since the deeper the groove, the more difficult it is to locate the contact point between the groove and the roller disk at about the groove half-depth position.

The construction of the roller disks 604 shown in FIG. 28 avoids these problems. In particular, the roller disks 604a and 604b each have axially outward and oppositely facing first and second sidewalls 608 and 610, respectively, which form the roller surfaces for contact with the helical grooves. The disks also include first and second annular extensions 612 and 614, respectively. The first and second extensions 612 and 614 extending axially outward from the first and second sidewalls 608 and 610, respectively, and space the adjacent roller disks 604a and 604b axially apart to provide the desired roller pitch. By increasing the axial length of the first and second extensions 612 and 614 used, the roller pitch can be increased as needed without impacting the size and shape of the first and second roller sidewalls 608 and 610, which may be designed for optimum groove contact. By increasing the spacing between the sidewalls of adjacent disks 604a and 604b over that provided by the inherently closely spaced sidewalls of the roller embodiment of FIGS. 9 and 10, even when using the same size diameter disk, the roller disks 604a and 604b can project deeper into the helical grooves. This is because the interference inherent in the closely spaced adjacent disks of FIG. 9 and 10 is avoided As such, the helical grooves can be cut wider and the disks 604 will still contact the helical grooves at the groove half-depth position.

In addition, with the disks 604 of FIG. 28 the first and second sidewalls 608 and 610 can be machined with a larger radius of curvature for improved groove contact without undesirable contact of the edges of the rollers with the ridges of the helical grooves, which has been a particular problem when using axially skewed rollers. To select the curvature of the first and second sidewalls 608 and 610, the surfaces of the helical grooves are diagramatically extended to determine the location of a sharp peak position 611 for the ridge of the helical groove and a sharp valley position 613 for the groove, as shown by the projection lines 616 in FIG. 28. A center position 618, half way between the peak and valley positions 612 and 614, is next determined. This mid-point establishes a pitch line 615 (i.e., the point used to determine the pitch diameter of the helical grooves). A line 620 is then projected at a right angle to the grooved surface, as shown in FIG. 28 for the first sidewall surface 608 of the roller 604b for purposes of illustration. For axially skewed rollers in alignment with the helical groove, the line 620 is used to locate the center of curvature for the roller sidewall. When the roller is not axially skewed, the groove width must be increased and clearance provided between the roller and groove so that the roller can be out of alignment with the groove. To determine the center of curvature to be used for the roller sidewalls 608 when not axially skewed, a second line 622 is positioned parallel to the line 620 and spaced laterally therefrom along the pitch line toward the roller disk by the clearance to permit the out of alignment positioning of the roller in the grooves (the roller is shown in FIG. 28 aligned with the groove). This establishes a point 624 on the roller surface and the line 622 is a radial line used for determining the center of curvature of the roller, with the center of curvature being at a point 626.

When in engagement with the groove, the roller will contact the groove along the pitch line 615, at the point 624 on the roller and the point 618 on the groove. This provides rolling engagement much like a spherical ball bearing having a radius equal to the radius of curvature selected for the roller surface. The radius of curvature is selected as large as possible, but small enough to avoid edge contact (i.e., contact between the roller and the grooves along parts of the roller surface outward of the point 624). Edge contact is minimized by further providing the roller surface with a reverse radius of curvature using a point 627 as the center of curvature. This is to provide an enlarged space between the roller and the groove to make certain any edge contact and the wear resulting therefrom is avoided. It is noted that the grooves used with the rollers 600 have truncated ridges 628 to further minimize edge contact.

It will be appreciated that, although specific embodiments of the invention have been described herein for purposes of illustration, various modifications may be made without departing from the spirit and scope of the invention. Accordingly, the invention is not limited except as by the appended claims

I claim:

1. A fluid-power device, comprising:
   a body;
   an axially extending drive member supported for movement relative to said body and connectable to an external device, one of said body or said drive member having a plurality of helical grooves with ridges therebetween formed on a surface portion thereof and having an axial pitch and a lead angle with a left-hand or right-hand turn;
   a plurality of rollers, each having at least one circumferential ridge;
   an axially reciprocating member reciprocally mounted within said body, said reciprocating member rotatably retaining said rollers in fixed axial and circumferential position relative to said reciprocating member during powered operation of the fluid-power device, said rollers being retained by said reciprocating member in circumferentially distributed arrangement in seated rolling engagement with said grooved surface portion for transmitting force between said reciprocating member and the one of said body or said drive member having said grooved surface portion, each ridge of said rollers being positioned for rolling travel in the corresponding grooves of said grooved surface portion, said rollers being retained by said reciprocating member in an axially skewed position relative to said body or drive member with which engaged, such that the angle of skew corresponds to said hand turn of said engaged helical groove so as to improve angular alignment of said roller ridges with said engaged helical grooves of said grooved surface portion;
   means for transmitting torque between said reciprocating member and the other of said body or said drive member; and
   at least one piston mounted for reciprocal movement and operatively engaging said reciprocating member.

2. The device of claim 1 wherein said rollers have a skew angle generally corresponding to said lead angle of said helical grooves.

3. The device of claim 1 wherein said rollers are circumferentially spaced apart with substantially equal inter-roller spacing therebetween, and the number of helical grooves of said grooved surface portion is equal to about the sum of an integer number plus 0.5, times the number of said rollers.

4. The device of claim 1 wherein the number of said helical grooves of said grooved surface portion is equal to about the sum of an integer number plus 0.5, times the number of equally spaced circumferentially adjacent positions for rollers for engagement therewith.

5. The device of claim 4 wherein circumferentially adjacent ones of said rollers are axially offset relative to each other by about 0.5 times the axial spacing between said roller ridges.

6. The device of claim 1 wherein said rollers are axially positioned in generally coplanar relation and the number of helical grooves of said grooved surface portion is an integer multiple of the number of equally spaced circumferentially adjacent positions for rollers for engagement therewith.

7. The device of claim 1 wherein said reciprocating member includes a plurality of spindles each rotatably and coaxially retaining at least one roller of said rollers and positioned adjacent to said grooved surface portion, said spindles being circumferentially distributed about said grooved surface portion to position said rollers in seated rolling engagement therewith, said spindles retaining said rollers against axial movement relative thereto and in said axially skewed position, said spindles being retained by said reciprocating member to prevent axial movement of said spindles relative to said reciprocating member during powered operation of the fluid-power device.

8. The device of claim 7 wherein said rollers each have a longitudinally extending substantially coaxial roller bore therethrough rotatably receiving one of said spindles, said axial bore being defined by an interior sidewall, corresponding ones of said roller bore sidewalls and spindles having integrally formed thereon a plurality of confronting and corresponding ball races defining a plurality of ball channels extending circumferentially thereabout, and the fluid-power device further includes a plurality of balls seated in said ball channels to restrict axial movement of said rollers relative to said spindles while permitting free rotation of said rollers on said spindles.

9. The device of claim 8 wherein each of said rollers is defined by a plurality of rings disposed on one of said spindles, each of said rings having a radially outward facing surface portion shaped to form in combination with the other of said plurality of rings said roller ridges.

10. The device of claim 7 wherein each of said spindles is supported at one end by a cantilever support arm rigidly attached thereto, and said reciprocating member includes a sleeve portion having a plurality of circumferentially spaced apart bore holes formed in an end portion thereof, each said bore hole sized to receive one of said support arms, said support arms being disposed in said sleeve bore hoes with said spindles supported thereon and positioned axially beyond said end portion of said sleeve portion.

11. The device of claim 10 wherein said support arm and spindle for each of said rollers are attached together in coaxial relation to form a substantially straight, elongated member, and said sleeve bore holes are formed in said reciprocating member sleeve portion at a bore hole skew angle corresponding to said roller skew angle.

12. The device of claim 10 wherein said support arm and spindle for each of said rollers are attached together in eccentric relation to form an angled member with said spindle angled relative to said support arm by an angle corresponding to said roller skew angle, and said sleeve bore holes are formed in said reciprocating member sleeve portion in substantially parallel axial alignment with the one of said body or said drive member having said grooved surface portion.

13. The device of claim 7 wherein each of said spindles is supported between first and second support arms, and said reciprocating member includes at least one recess with at least one of said rollers positioned therein and projecting radially beyond said reciprocating member to rollingly engage said grooved surface portion, said recess having a pair of opposed and axially spaced apart wall portions with each of said wall portions supporting one or the other of said first and second support arms.

14. The device of claim 13 wherein said first and second support arms for each spindle are coaxial, and said support arms and spindle for each said roller are attached together in coaxial relation.

15. The device of claim 14 further including a coaxial pair of bore holes sized to receive said first and second support arms, with said pair of bore holes having one bore hole in one of said wall portions and the other bore hole in the other of said wall portions at a bore hole skew angle corresponding to said roller skew angle, said first and second support arms for each said spindle being disposed in said pair of bore holes.

16. The device of claim 14 wherein said first and second support arms extend outward from said spindle beyond said wall portions of said recess and are rigidly fastened to said reciprocating member with a selected axial angular orientation.

17. The device of claim 13 wherein said first and second support arms are coaxial, and said support arms and spindle for each said roller are attached together in eccentric relation with said spindle angled relative to said first and second support arms at an angle corresponding to said roller skew angle, and further including a pair of bore holes sized to receive said first and second support arms, with each pair of said bore holes having one bore hole in one of said wall portions and the other bore hole in the other of said wall portions in substantially parallel axial alignment with the one of said body or said drive member having said grooved surface portion.

18. The device of claim 13 wherein said recess is a transverse open-ended slot in an end portion of said reciprocating member.

19. The device of claim 13 wherein said recess is a window extending transversely fully through said reciprocating member.

20. The device of claim 13 wherein said reciprocating member includes a plurality of said recesses circumferentially spaced apart.

21. The device of claim 13 wherein said recess is a circumferentially extending recess opening toward the one of said body or said drive member having said grooved surface portion, and said rollers are disposed in said recess and circumferentially spaced apart from each other.

22. The device of claim 7 wherein at least one of said spindles is selectively and adjustably axially movable relative to said reciprocating member, and the fluid-power device further includes adjustment means for selectively and adjustably axially moving said movable spindle in an axial direction within at least a limited range to axially move said roller rotatably retained on said movable spindle to eliminate backlash resulting from said roller coacting with said grooved surface portion as said piston moves from one axial direction to the other within said body as it reciprocates.

23. The device of claim 22 wherein said movable spindle is supported by at least one support arm, said support arm and movable spindle being attached together in eccentric relation with said spindle angled relative to said support arm at an angle corresponding to said roller skew angle, said support arm being disposed on an axis in substantial parallel axial alignment with the one of said body or said drive member having said grooved surface portion and rotatably supporting said movable spindle for selective and adjustable eccentric movement about said axis, and wherein said adjustment means includes control means for selectively and adjustably rotating said supported movable spindle about said axis to produce eccentric movement of said roller retained thereon, whereby rotation of said supported movable spindle and said roller retained thereon produces movement of said roller in said axial direction for elimination of backlash.

24. The device of claim 23 wherein said control means includes a member selectively extendable to engage a portion of said supported movable spindle at a position offset from said axis to apply an adjustment torque thereon to rotate said supported movable spindle eccentrically about said axis.

25. The device of claim 24 wherein said engagement portion of said supported movable spindle is an engagement surface oriented at an oblique angle relative to said axis and said extendable member is supported by said reciprocating member for selective extension relative to said reciprocating member to engage said inclined engagement surface.

26. The device of claim 24 including a plurality of said supported movable spindles, each positioned circumferentially adjacent to the other and each having both said engagement portion to be engaged by said extendable member of the next adjacent spindle to one side thereof and said extendable member to engage said engagement portion of the next adjacent spindle to the other side.

27. The device of claim 1 wherein circumferentially adjacent one of said rollers are axially offset relative to each other.

28. The device of claim 27 further including spacer means for holding said axially offset circumferentially adjacent ones of said rollers at a fixed axial offset position relative to the other ones of said rollers.

29. A fluid-power device, comprising:
a body having a plurality of helical grooves with ridges therebetween formed on an inward facing surface portion thereof, said body helical grooves having a first axial pitch and a first lead angle with a first left-hand or right-hand turn;
an axially extending drive member supported for movement relative to said body and connectable to an external device, said drive member having a plurality of helical grooves with ridges therebetween formed on an outward facing surface portion thereof positioned within said body, said drive member grooves having a second axial pitch and a second lead angle with a second left-hand or right-hand turn;

a first plurality of elongated rollers having circumferential grooves with ridges therebetween;

a second plurality of elongated rollers having circumferential grooves with ridges therebetween;

an axially reciprocating member reciprocally mounted within said body, said reciprocating member rotatably retaining said first and second pluralities of rollers in fixed axial and circumferential position relative to said reciprocating member during powered operation of the fluid-power device, said reciprocating member retaining said first plurality of rollers in circumferentially distributed arrangement in seated rolling engagement with said grooved body inward surface portion and retaining said second plurality of rollers in circumferentially distributed arrangement in seated rolling engagement with said grooved drive member outward surface position for transmitting force between said body, drive member and reciprocating member, each ridge of said first plurality of rollers being positioned for rolling travel in the corresponding grooves of said body and out of engagement with said grooves of said drive member, and each ridge of said second plurality of rollers being positioned for rolling travel in the corresponding grooves of said drive member and out of engagement with said grooves of said body, at least said first or second pluralities of rollers being retained by said reciprocating member in an axially skewed position relative to the one of said body or drive member with which engaged, such that the angle of skew corresponds to said first or second hand turn of said engaged body or drive member helical grooves so as to improve angular alignment of said roller ridges with said engaged body or drive member helical grooves; and at least one piston mounted for reciprocal movement and operatively engaging said reciprocating member.

30. The device of claim 29 wherein said axially skewed first or second plurality of rollers have an axial pitch corresponding to said first or second axial pitch of said body or drive member helical grooves with which engaged.

31. The device of claim 29 wherein said first plurality of rollers are axially positioned toward one end of said reciprocating member axially spaced away from said grooved drive member outward surface portion, and said second plurality of rollers are axially positioned toward an opposite end of said reciprocating member axially spaced away from said grooved body inward surface portion.

32. The device of claim 31 wherein said grooved body inward surface portion and said grooved drive member outward surface portion are axially spaced apart and substantially not axially overlapping.

33. The device of claim 29 wherein said first and second pluralities of rollers are in fixed radial position relative to said reciprocating member with said first plurality of rollers being radially positioned spaced outward of said grooved drive member outward surface portion and with said second plurality of rollers being radially positioned spaced inward of said grooved body inward surface portion.

34. The device of claim 33 wherein said first and second pluralities of rollers are positioned in generally circumferentially aligned arrangement with the other, with rollers of said first and second pluralities of being positioned circumferentially adjacent each other.

35. The device of claim 29 wherein at least said first plurality of rollers have an axial pitch corresponding to said first axial pitch and are angularly skewed at an angle generally corresponding to said first lead angle, or said second plurality of rollers have an axial pitch corresponding to said second axial pitch and are angularly skewed at an angle generally corresponding to said second lead angle.

36. The device of claim 29 wherein said axially skewed first or second plurality of rollers are skewed at an angle substantially equal to said first or second lead angle of said body or drive member helical grooves with which engaged.

37. The device of claim 29 wherein said first plurality of rollers are rotatably attached to said reciprocating member toward one end portion thereof, and said second plurality of rollers are rotatably attached to said reciprocating member at an opposite end portion thereof axially spaced apart from said first plurality of rollers.

38. The device of claim 37 wherein said first plurality of rollers are positioned axially outward of a first end of said reciprocating member toward one end of said body, and said second plurality of rollers are positioned axially outward of a second end of said reciprocating member toward an opposite end of said body.

39. The device of claim 29 wherein at least said first or second pluralities of rollers are circumferentially spaced apart with substantially equal inter-roller spacing therebetween, and the number of corresponding grooves of said plurality of body or drive member helical grooves is equal to about the sum of an integer number plus 0.5, times the number of said first or second pluralities of rollers.

40. The device of claim 29 wherein at least the number of said plurality of drive member helical grooves or the number of said plurality of body helical grooves is equal to about the sum of an integer number plus 0.5, times the number of equally spaced circumferentially adjacent positions for rollers for engagement therewith.

41. The device of claim 40 wherein at least circumferentially adjacent ones of said first plurality of rollers are axially offset relative to each other by about 0.5 times the axial spacing between said roller ridges of said first plurality of rollers, or circumferentially adjacent ones of said second plurality of rollers are axially offset relative to each other by about 0.5 times the axial spacing between said roller ridges of said second plurality of rollers.

42. The device of claim 29 wherein at least said first or second pluralities of rollers are axially positioned in generally coplanar relation, and the number of corresponding grooves of said plurality of body or drive member helical grooves is an integer multiple of the number of equally spaced circumferentially adjacent positions for rollers for engagement therewith.

43. The device of claim 29 wherein said reciprocating member includes a first plurality of spindles each rotatably and coaxially retaining at least one roller of said first plurality of rollers and positioned adjacent to said grooved body surface portion, said first plurality of spindles being circumferentially distributed about said grooved body surface portion to position said rollers of said first plurality of roller in seated rolling engagement with said grooved body surface portion, and a second plurality of spindles each rotatably and coaxially retaining at least one roller of said second plurality of rollers and positioned adjacent to said grooved drive member surface portion, said second plurality of spindles being circumferentially distributed about said grooved drive member surface portion to position said rollers of said second plurality of rollers in seated engagement with said grooved drive member surface portion, said spindles retaining said rollers against axial movement relative thereto and retaining said axially skewed first or second plurality of rollers at said roller skew angle, said spindles being retained by said reciprocating member to prevent axial movement of said spindles relative to said reciprocating member during powered operation of the device.

44. The device of claim 43 wherein said rollers each have a longitudinally extending substantially coaxial roller bore therethrough rotatably receiving one of said spindles, said axial bore being defined by an interior sidewall, corresponding ones of said roller bore sidewalls and spindles having formed thereon a plurality of confronting and corresponding ball races defining a plurality of ball channels extending circumferentially thereabout, and the fluid-power device further includes a plurality of balls seated in said ball channels to restrict axial movement of said rollers relative to said spindles while permitting free rotation of said rollers on said spindles.

45. The device of claim 44 wherein each of said rollers is defined by a plurality of rings disposed on one of said spindles in juxtaposition, each of said rings having a radially outward facing surface portion shaped to form in combination with the other of said plurality of rings said roller grooves and ridges.

46. The device of claim 45 wherein said rings having first and second axially outward oppositely facing sidewalls each with an axially outward opening circumferential ball groove formed thereon, said first and second sidewall ball grooves being axially spaced apart so that said ring ball grooves on adjacent first and second ring sidewalls of adjacent pairs of said rings define one of said roller ball races.

47. The device of claim 43 wherein each of said spindles is supported at one end by a cantilever support arm rigidly attached thereto, and said reciprocating member includes a sleeve portion having a first plurality of circumferentially spaced apart bore holes formed in a first end portion thereof and a second plurality of circumferentially spaced apart bore holes formed in an opposite second end portion thereof, each said bore hole being sized to receive one of said support arms, said support arms being disposed in said bore holes with said first and second pluralities of spindles supported thereon and positioned axially beyond said first and second end portions of said sleeve portion, respectively.

48. The device of claim 47 wherein said support arm and spindle for each of said axially skewed first or second plurality of rollers are attached together in coaxial relation to form a substantially straight, elongated member, and said bore holes for said axially skewed first or second plurality of rollers are formed in said first or second end portion of said sleeve portion at a bore hole skew angle corresponding to said roller skew angle.

49. The device of claim 47 wherein said support arm and spindle for each of said axially skewed first or second plurality of rollers are attached together in eccentric relation to form an angled member with said spindle angled relative to said support arm by an angle corresponding to said roller skew angle, and said bore holes are formed in said first or second end portion of said sleeve portion in substantially parallel axial alignment with the one of said body or said drive member with which said axially skewed first or second plurality of rollers are engaged.

50. The device of claim 43 wherein each of said spindles is supported between first and second support arms.

51. The device of claim 50 wherein said reciprocating member includes a first plurality of recesses with at least one of said rollers of said first plurality of rollers positioned therein and projecting radially outward beyond said reciprocating member to rollingly engage said grooved body inward surface portion, and includes a second plurality of recesses with at least one of said rollers of said second plurality of rollers positioned therein and projecting radially inward beyond said reciprocating member to rollingly engage said grooved drive member outward surface portion, each said recess having a pair of opposed and axially spaced apart wall portions with each said wall portions supporting one or the other of said first or second support arms for said roller positioned therein.

52. The device of claim 51 wherein said recesses of said first and second pluralities of recesses are in substantially circumferential alignment.

53. The device of claim 51 wherein said first and second support arms extend outward from said spindle beyond said wall portions of said recess and are rigidly fastened to said reciprocating member with a selected axial angular orientation.

54. The device of claim 51 wherein each of said first and second pluralities of recesses is a window extending transversely fully through said reciprocating member 55. The device of claim 51 wherein each of said first and second pluralities of recesses is a transverse open-ended slot in an end portion of said reciprocating member.

56. The device of claim 51 wherein said first and second support arms for each spindle are coaxial, and said support arms and spindle for each said roller are attached together in coaxial relation.

57. The device of claim 56 further including a coaxial pair of bore holes for each of said first and second pluralities of recesses sized to receive said first and second support arms for said roller positioned in said recess, with said pairs of bore holes for said axially skewed first or second plurality of rollers having one bore hole in one of said wall portions and the other bore hole in the other of said wall portions at a bore hole skew angle corresponding to said roller skew angle for said axially skewed first or second plurality of rollers, said first and second support arms for each said spindle being disposed in said pair of bore holes.

58. The device of claim 50 wherein said reciprocating member includes a first circumferentially extending recess opening radially toward said body and having said first plurality of rollers disposed therein circumferentially spaced apart from each other, said first plurality of rollers projecting radially outward beyond said reciprocating member to rollingly engage said grooved body inward surface portion, and includes a second circumferentially extending recess opening radially inward toward said drive member and having said second plurality of rollers disposed therein circumferentially spaced apart from each other, said second plurality of rollers projecting radially inward beyond said reciprocating member to rollingly engage said grooved drive member outward surface portion.

59. The device of claim 50 wherein said first and second support arms are coaxial, and said support arms and spindle for each said roller of said axially skewed first or second plurality of rollers are attached together in eccentric relation with said spindle angled relative to said first and second support arms at an angle corresponding to said roller skew angle.

60. The device of claim 59 further including a plurality of pairs of bore holes sized to receive said first and second support arms, with each pair of said bore holes having one bore hole in one wall portion of a recess of said reciprocating member and the other bore hole in another opposed and axially spaced apart wall portion of said recess, each said pair of said bore holes being in substantially parallel axial alignment with the one of said body or drive member engaged by said axially skewed first or second plurality of rollers.

61. The device of claim 43 wherein said spindles of at least said first or second plurality of spindles are selectively and adjustably axially movable relative to said reciprocating member, and the fluid-power device further includes adjustment means for selectively and adjustably axially moving said movable spindles in an axial direction within at least a limited range to axially move said rollers rotatably retained thereon to eliminate backlash resulting from said rollers coacting with said body or drive member helical grooves as said piston moves from one axial direction to the other within said body as it reciprocates.

62. The device of claim 61 wherein said spindles of said first and second plurality of spindles are selectively and adjustably axially movable with respect to said reciprocating member, with said movable spindles of said first plurality of spindles and said movable spindles of said second plurality of spindles being movable in opposite axial directions to eliminate backlash.

63. The device of claim 61 wherein said movable spindles are eccentrically rotatable to axially move the contact points of said rollers retained thereon with the corresponding grooves of said body or drive member.

64. The device of claim 61 wherein each of said movable spindles retaining one of said axially skewed first or second plurality of rollers is supported by at least one support arm, said support arm and said movable spindle being attached together in eccentric relation with said spindle angled relative to said support arm at an angle corresponding to said roller skew angle, said support arm being disposed on an axis in substantial parallel axial alignment with said body and rotatably supporting said movable spindle for selective and adjustable eccentric movement about said axis, and wherein said adjustment means includes control means for selectively and adjustably rotating sad supported movable spindle about said axis to produce eccentric movement of said roller retained thereon, whereby rotation of said supported movable spindle and said roller retained thereon produces movement of said roller in said axial direction for elimination of backlash.

65. The device of claim 64 wherein said control means includes a member selectively extendable to engage a portion of said supported movable spindle at a position offset from said axis to apply an adjustment torque thereon to rotate said supported movable spindle eccentrically about said axis.

66. The device of claim 65 wherein said engagement portion of said supported movable spindle is an engagement surface oriented at an oblique angle relative to said axis and said extendable member is supported by said reciprocating member for selective extension relative to said reciprocating member to engage said inclined engagement surface.

67. The device of claim 65 wherein said supported movable spindles are positioned circumferentially adjacent to each other and each has both said engagement portion to be engaged by said extendable member of the next adjacent spindle to one side thereof and said extendable member to engage said engagement portion of the next adjacent spindle to the other side.

68. The device of claim 29 wherein circumferentially adjacent ones of said first or second plurality of rollers are positioned axially offset relative to each other.

69. The device of claim 68 wherein circumferentially adjacent ones of said spindles corresponding to said axially offset circumferentially adjacent rollers are positioned axially offset relative to each other.

70. The device of claim 69 wherein said axially offset circumferentially adjacent spindles includes spacer means for holding said axially offset spindles at a fixed axial offset position relative to the other ones of said spindles.

71. The device of claim 29 wherein said reciprocating member includes a plurality of spindles each rotatably and coaxially retaining at least one roller of said axially skewed first or second plurality of rollers and being positioned adjacent to the corresponding one of said grooved body or drive member surface portion, said spindles being circumferentially distributed about said grooved body or drive member surface portion to position said rollers of said axially skewed first or second plurality of rollers retained thereon in seated rolling engagement with the corresponding one of said grooved body or drive member surface portion, said spindles retaining said rollers against axial movement relative thereto and at said roller skew angle, said spindles being retained by said reciprocating member to prevent axial movement of said spindles relative to said reciprocating member during powered operation of the fluid-power device.

72. The device of claim 71 wherein said spindles are selectively and adjustably axially movable relative to said reciprocating member, and the fluid-power device further includes adjustment means for selectively and adjustably axially moving said movable spindles in an axial direction within at least a limited range to axially move said rollers rotatably retained on said movable spindles to eliminate backlash resulting from said rollers coacting with said body or drive member helical grooves as said piston moves from one axial direction to the other within said body as it reciprocates.

73. The device of claim 72 wherein said movable spindles are eccentrically rotatable by said adjustment means to axially move the contact points of said rollers retained thereon with the corresponding grooves of said body or drive member.

74. The device of claim 72 wherein each of said movable spindles retaining one of said rollers of said axially skewed first or second plurality rollers is supported by at least one support arm, said support arm and said movable spindle being attached together in eccentric relation with said spindle angled relative to said support arm at an angle corresponding to said roller skew angle, said support arm being aligned on an axis in substantial parallel axial alignment with said body and rotatably supporting said movable spindle for selective and adjustable eccentric movement about said axis, and wherein said adjustment means includes control means for selectively and adjustably rotating said supported movable spindle about said axis to produce eccentric movement of said roller retained thereon, whereby rotation of said supported movable spindle and said roller retained thereon produces movement of said roller in said axial direction for elimination of backlash.

75. A fluid-power device, comprising:
   a body;
   an axially extending drive member supported for movement relative to said body and connectable to an external device, one of said body or said drive member having a plurality of helical grooves formed on a surface portion thereof positioned within said body, said grooves having an axial pitch and a lead angle with a left-hand or right-hand turn;
   a plurality of rollers, each having at least one circumferential ridge and being rotatably supported by a spindle, each said spindle being supported between first and second support arms;
   an axially reciprocating member reciprocally mounted within said body, said reciprocating member supportably retaining first and second support arms in fixed axial and circumferential position relative to said reciprocating member during powered operation of the fluid-power device, with said rollers in seated rolling engagement with said grooves for transmitting force between said reciprocating member and said grooved one of said body or drive member, said ridges of said rollers being positioned for rolling travel in the corresponding helical grooves;
   means for transmitting torque between said reciprocating member and the other of said body of drive member; and
   at least one piston mounted for reciprocal movement and operatively engaging said reciprocating member.

76. The device of claim 75 wherein said spindles retain said rollers in an axially skewed position relative to said body or drive member with which engaged, such that the angle of skew corresponds to said hand turn of said engaged body or drive member helical grooves to improve angular alignment of said roller ridges with said engaged body or drive member helical grooves.

77. The device of claim 76 wherein said rollers are coaxially retained by said spindles and said spindles are circumferentially distributed about said grooved body or drive member surface portion with which said rollers are engaged, and wherein said first and second support arms and said spindle therebetween are attached together in eccentric relation with said spindle angles relative to said support arms at an angle corresponding to said roller skew angle, said first and second support arms are coaxially extending along an axial in substantial parallel alignment with said body and rotatably support said spindle for selective and adjustable eccentric rotational movement about said axis, and the fluid-power device further includes means for selectively and adjustably rotating said spindle about said axis to produce eccentric movement of said roller retained thereon, with said eccentric movement producing a component of movement of said roller in an axial direction relative to said body or drive member surface portion with which said roller is engaged for elimination of backlash.

78. A fluid-power device, comprising:
   a body;
   an axially extending drive member supported for movement relative to said body and connectable to an external device, one of said body or said drive member having a plurality of helical grooves with ridges therebetween formed on a surface portion thereof positioned within said body;
   an axially reciprocating member reciprocally mounted within said body;
   a plurality of rollers having circumferential grooves with ridges therebetween;
   a plurality of cantilever spindles having a free, unattached first end portion extending into a circumferential space adjacent to said grooved surface portion and circumferentially distributed thereabout, said spindle free end portions each having at least one of said rollers coaxially and rotatably retained thereon and retained against axial movement relative to said spindles, each said spindle having a second end portion attached to said reciprocating member to support said first end portion in cantilevered manner and to prevent axial and circumferential movement of said spindle, said reciprocating member retaining said spindle free first end portions and said rollers rotatable retained thereon in fixed axial and circumferential position relative to said reciprocating member during powered operation of the fluid-power device, said rollers on said spindles being retained by said reciprocating member in circumferentially distributed arrangement in seated rolling engagement with said grooved surface portion for transmitting force between said reciprocating member and the one of said body or said drive member having said grooved surface portion, each ridge of said rollers being positioned for rolling travel in the corresponding grooves of said grooved surface portion;
   an annular spindle support plate having a central opening through which said drive member extends and a plurality of circumferentially distributed spindle openings, each said spindle opening receiving one of said spindle free first end portions therethrough and providing support thereto against lateral forces on said spindles, said support plate being attached to said spindles for travel therewith during powered operation of the fluid-power device;
   means for transmitting torque between said reciprocating member and the other of said body or said drive member; and
   at least one piston mounted for reciprocal movement and operatively engaging said reciprocating member.

79. A fluid-power device, comprising:
   a body;
   an axially extending drive member supported for movement relative to said body and connectable to an external device, one of said body or said drive member having a plurality of helical grooves with ridges therebetween formed on a surface portion thereof positioned within said body;
   an axially reciprocating member reciprocally mounted within said body;
   a plurality of rollers having circumferential grooves with ridges therebetween, each being defined by a plurality of annular rings coaxially aligned and positioned together, each of said rings having a radially outward facing surface portion shaped to form in combination with the other of said plurality of rings said roller grooves and ridges, at least one of said rings further including at least one annular skirt coaxial with said one ring and axially extending therefrom toward the next adjacent one of said rings, whereby said surface portions of said plurality of rings can be axially spaced apart to provide a desired roller pitch;

a plurality of cantilever spindles having a free, unattached first end portion extending into a circumferential space adjacent to said grooved surface portion and circumferentially distributed thereabout, said spindle free end portions each having at least one of said rollers coaxially and rotatably retained thereon and retained against axial movement relative to said spindles, each said spindle having a second end portion attached to said reciprocating member to support said first end portion in cantilevered manner and to prevent axial and circumferential movement of said spindle, said reciprocating member retaining said spindle free first end portions and said rollers rotatable retained thereon in fixed axial and circumferential position relative to said reciprocating member during powered operation of the fluid-power device, said rollers on said spindles being retained by said reciprocating member in circumferentially distributed arrangement in seated rolling engagement with said grooved surface portion for transmitting force between said reciprocating member and the one of said body or said drive member having said grooved surface portion, each ridge of said rollers being positioned for rolling travel in the corresponding grooves of said grooved surface portion;

means for transmitting torque between said reciprocating member and the other of said body or said drive member; and at least one piston mounted for reciprocal movement and operatively engaging said reciprocating member.

80. The device of claim 79 where each said ring includes annular first and second skirts, one of said first or second skirts extending axially to each side thereof, and said first and second skirts each have an axially outward opening circumferential ball groove formed thereon.

81. The device of claim 80 wherein said first and second skirt ball grooves are axially spaced apart so that one of said skirt ball grooves corresponds to and cooperates with one of said skirt ball grooves of an adjacent one of said rings to define a roller ball race to receive a ball.

82. The device of claim 79 wherein said rollers retained on said spindles each have a longitudinally extending substantially coaxial roller bore therethrough rotatably receiving one of said spindles, said axial bore being defined by an interior sidewall, corresponding ones of said roller bore sidewalls and spindles having formed thereon a plurality of confronting and corresponding ball races defining a plurality of ball channels extending circumferentially thereabout, and the fluid-power device further includes a plurality of balls seated in said ball channels to restrict axial movement of said rollers relative to said spindles while permitting free rotation of said rollers on said spindles.

83. A fluid-power device, comprising:

a body;

an axially extending drive member supported for movement relative to said body and connectable to an external device, one of said body or said drive member having at least one helical groove formed on a surface portion thereof positioned within said body;

at least one roller having at least one circumferential ridge;

an axially reciprocating member reciprocally mounted within said body, said reciprocating member rotatably retaining said roller in fixed axial and circumferential position relative to said reciprocating member during powered operation of the fluid-power device with said roller in seated rolling engagement with said grooved surface portion for transmitting force between said reciprocating member and the one of said body or said drive member having said grooved surface portion, said ridge of said roller being positioned for rolling travel in said helical groove of said grooved surface portion;

means for transmitting torque between said reciprocating member and the other of said body or said drive member; and at least one piston mounted for reciprocal movement and operatively engaging said reciprocating member.

84. The device of claim 83 wherein said at least one groove includes a plurality of helical grooves with ridges therebetween and said at least one roller includes a plurality of rollers with each ridge of said rollers being positioned for rolling travel in one of said helical grooves, and wherein the number of said plurality of helical grooves is an integer multiple of the number of equally spaced circumferentially adjacent positions for roller for engagement therewith.

85. The device of claim 83 wherein said at least one groove includes a plurality of helical grooves with ridges therebetween and said at least one roller includes a plurality of rollers with each ridge of said rollers being positioned for rolling travel in one of said helical grooves, and wherein said reciprocating member includes a plurality of spindles extending into a circumferential space adjacent to said grooved surface portion and circumferentially distributed thereabout, said spindles each having at least one of said rollers coaxially and rotatably retained thereon and retained against axial movement relative to said spindles, said spindles being retained by said reciprocating member to prevent axial movement of said spindles relative to said reciprocating member during powered operation of the fluid-power device.

86. The device of claim 85 wherein said rollers retained on said spindles each have a longitudinally extending substantially coaxial roller bore therethrough rotatably receiving one of said spindles, said axial bore being defined by an interior sidewall, corresponding one of said roller bore sidewalls and spindles having integrally formed thereon a plurality of confronting and corresponding ball races defining a plurality of ball channels extending circumferentially thereabout, and the fluid-power device further includes a plurality of balls seated in said ball channels to restrict axial movement of said rollers relative to said spindles while permitting free rotation of said rollers on said spindles.

87. The device of claim 85 wherein said plurality of spindles each has an attached end portion connected to said reciprocating member and a free end portion positioned in said circumferential space, said spindle free end portions being circumferentially distributed within said circumferential space, said spindles each having at least one of said rollers coaxially and rotatably retained on said free end portion to provide a cantilevered support and retained against axial movement relative to said free end portion.

88. The device of claim 83 wherein said at least one groove includes a plurality of helical grooves with ridges therebetween and said at least one roller has a plurality of said circumferential ridges with a groove between adjacent pairs pairs of said ridges, and is defined by a plurality of annular rings coaxially aligned and positioned together on a spindle, each of said rings having a radially outward facing surface portion shaped to form in combination with the other of said plurality of rings said roller grooves and ridges.

89. The device of claim 88 wherein at least one of said rings further includes at least one annular skirt coaxial with said one ring and axially extending therefrom toward the next adjacent one of said rings, whereby said surface portions of said plurality of rings can be axially spaced apart to provide a desired roller pitch.

90. The device of claim 88 where each said ring includes annular first and second skirts, one of said first or second skirts extending to each side thereof.

91. The device of claim 90 wherein said first and second skirts each have an axially outward opening circumferential ball groove formed thereon, and said first and second skirt ball grooves are axially spaced apart so that one of said skirt ball grooves corresponds to and cooperates with one of said skirt ball grooves of an adjacent one of said rings to define a roller ball race to receive a ball.

92. The device of claim 83 wherein said helical groove of said grooved surface portion of said body or said drive member has an axial pitch and a lead angle with a left-hand or right-hand turn, and wherein said at least one roller is retained by said reciprocating member in axially skewed position relative to said body or drive member with which engaged, such that the angle of skew corresponds to said hand turn of said engaged helical groove to improve angular alignment of said roller ridge with said engaged helical groove of said grooved surface portion.

93. The device of claim 92 wherein said roller has a skew angle generally corresponding to said lead angle of said helical groove.

* * * * *

UNITED STATES PATENT AND TRADEMARK OFFICE
CERTIFICATE OF CORRECTION

PATENT NO. : 4,838,103

DATED : June 13, 1989

INVENTOR(S) : Paul P. Weyer

It is certified that error appears in the above-identified patent and that said Letters Patent is hereby corrected as shown below:

In claim 10, column 42, line 62, delete "hoes" and substitute therefor --holes--.
In claim 43, column 46, line 67, delete "roller" and substitute therefor --rollers--.
In claim 64, column 49, line 55, delete "sad" and substitute therefor --said--.
In claim 75, column 51, line 37, delete "of" and substitute therefor --or--.
In claim 77, column 51, line 56, delete "angles" and substitute therefor --angled--, line 59, delete "axial" and substitute therefor --axis--.
In claim 86, column 54, line 59, delete "one" and substitute therefor --ones--.

Signed and Sealed this

Eighth Day of May, 1990

Attest:

HARRY F. MANBECK, JR.

Attesting Officer

Commissioner of Patents and Trademarks